United States Patent [19]

French et al.

[11] Patent Number: 5,203,713

[45] Date of Patent: Apr. 20, 1993

[54] POWER DISTRIBUTION SYSTEM FOR MODULAR FURNITURE UNIT

[75] Inventors: Jay L. French, Middletown; John L. Himes, Jr., Hummelstown; James S. Hower, Harrisburg; Douglas J. Pirc, Mechanicsburg; Ronald M. Weber, Lebanon; James H. Wise, Palmyra, all of Pa.

[73] Assignee: AMP Incorporated, Wilmington, Del.

[21] Appl. No.: 791,054

[22] Filed: Nov. 12, 1991

Related U.S. Application Data

[63] Continuation-in-part of Ser. No. 714,318, Jun. 10, 1991, Pat. No. 5,092,787, which is a continuation of Ser. No. 539,284, Jun. 15, 1990, abandoned, which is a continuation of Ser. No. 394,775, Aug. 16, 1989, abandoned.

[51] Int. Cl.$^5$ .............................................. H01R 25/00
[52] U.S. Cl. ..................................... 439/215; 439/211; 439/687
[58] Field of Search ............... 439/207, 209, 211, 214, 439/215, 216, 210, 212

[56] References Cited

U.S. PATENT DOCUMENTS

| | | | |
|---|---|---|---|
| 3,634,809 | 1/1972 | Joly | 439/214 |
| 4,060,294 | 11/1977 | Haworth et al. | 439/215 |
| 4,199,206 | 4/1980 | Haworth et al. | 174/101 |
| 4,203,639 | 5/1980 | VandenHoek et al. | 439/210 |
| 4,231,630 | 11/1980 | Propst et al. | 439/210 |
| 4,241,965 | 12/1980 | Wilson et al. | 439/207 |
| 4,277,123 | 7/1981 | Haworth et al. | 439/215 |
| 4,295,697 | 10/1981 | Grime | 439/215 |
| 4,313,646 | 2/1982 | Millhimes et al. | 439/654 |
| 4,367,370 | 1/1983 | Wilson et al. | 174/48 |
| 4,370,008 | 1/1983 | Haworth et al. | 439/165 |
| 4,376,561 | 2/1983 | VandenHoek et al. | 439/210 |
| 4,382,648 | 5/1983 | Propst et al. | 439/209 |
| 4,666,223 | 5/1987 | Tillmann | 439/215 |
| 4,684,186 | 8/1987 | Hetherington | 439/171 |
| 4,740,167 | 4/1988 | Millhimes et al. | 439/654 |
| 4,775,328 | 10/1988 | McCarthy | 439/211 |
| 4,781,609 | 11/1988 | Wilson et al. | 439/215 |
| 4,918,886 | 4/1990 | Benoit et al. | 52/221 |
| 4,952,164 | 4/1990 | French et al. | 439/215 |
| 4,969,838 | 11/1990 | Himes, Jr. et al. | 439/532 |
| 5,024,610 | 6/1991 | French et al. | 439/857 |
| 5,046,963 | 9/1991 | Kelly | 439/211 |
| 5,092,786 | 3/1992 | Juhlin et al. | 439/215 |

OTHER PUBLICATIONS

Installing a powerway assembly into a series 9000 energy management corner worksurface 8 wire only, Steelcase Inc. 901 44th SE Grand Rapids, MI.
Installing directions for series 9000 energy management worksurface powerway assembly 8 wire only, Steelcasse Inc. 901 44th SE Grand Rapids, MI.
Installatioin for vertical power harness into a series 9000 energy management structural panel 4,5,8 wire– Steelcase Inc. 901 44th Street Grand Rapids, MI.
For NY only, Installation directions for channel power–in into a series 9000 energy management worksurface, Steelcase Inc. 901 44th Street Grand Rapids, MI.
Installation direrctions for series 9000 energy management worksurface to work-surface in–line connector—Steelcase Inc. 901 44th Street Grand Rapids, MI.
Installation directions for bridge unit pass–thru harness into a series 9000 energy management worksurface 8 wire only—Steelcase 901 44th Street Grand Rapids, MI.
Advertising Bulletin for Esprit Seven.

Primary Examiner—Gary F. Paumen
Attorney, Agent, or Firm—Price, Heneveld, Cooper, DeWitt & Litton

[57] ABSTRACT

A power distribution system includes a power outlet for connection to different power supply circuits in a power block when assembled thereto. The system includes a power block having arrays of openings on the front and back faces which are vertically staggered.

23 Claims, 25 Drawing Sheets

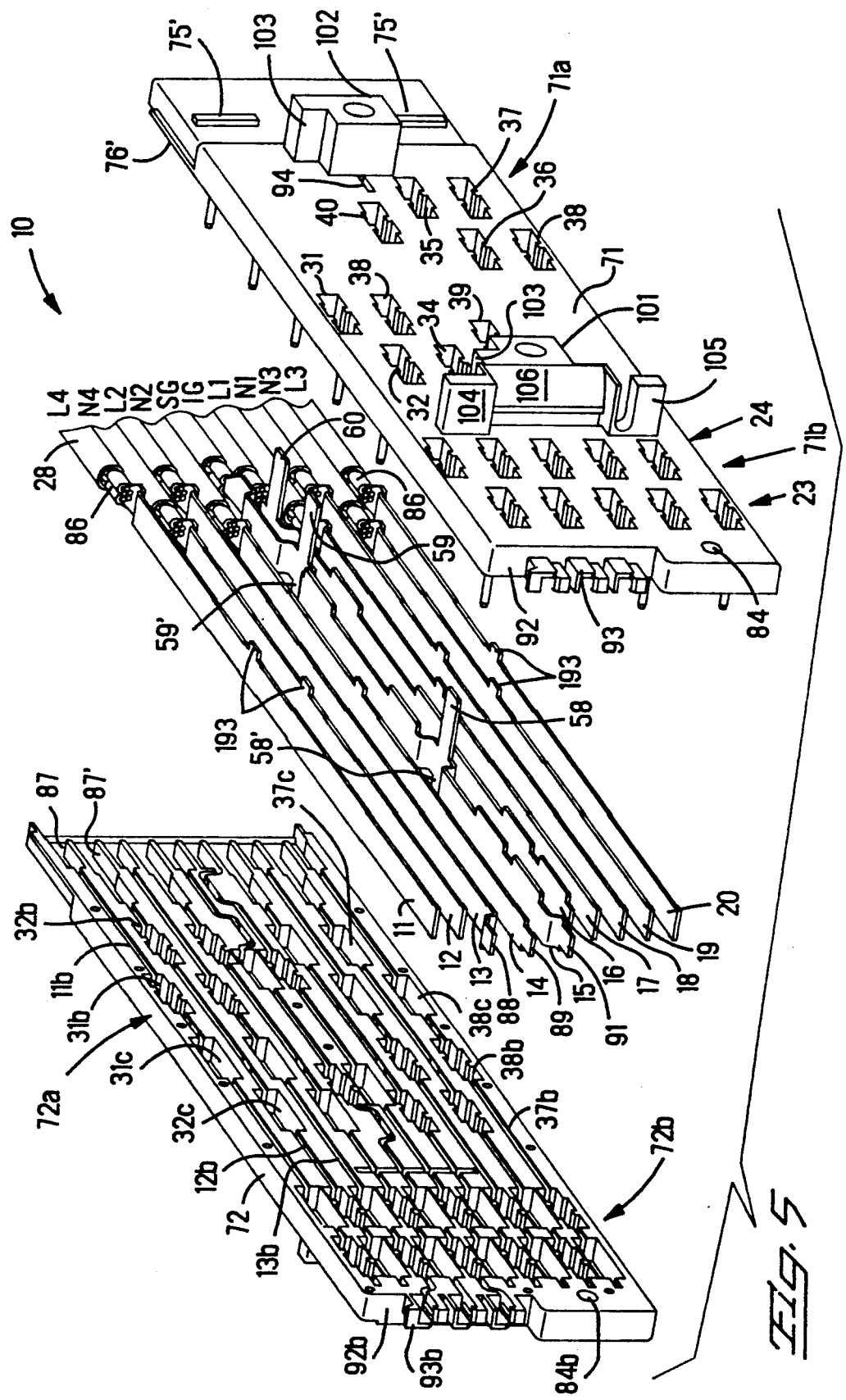

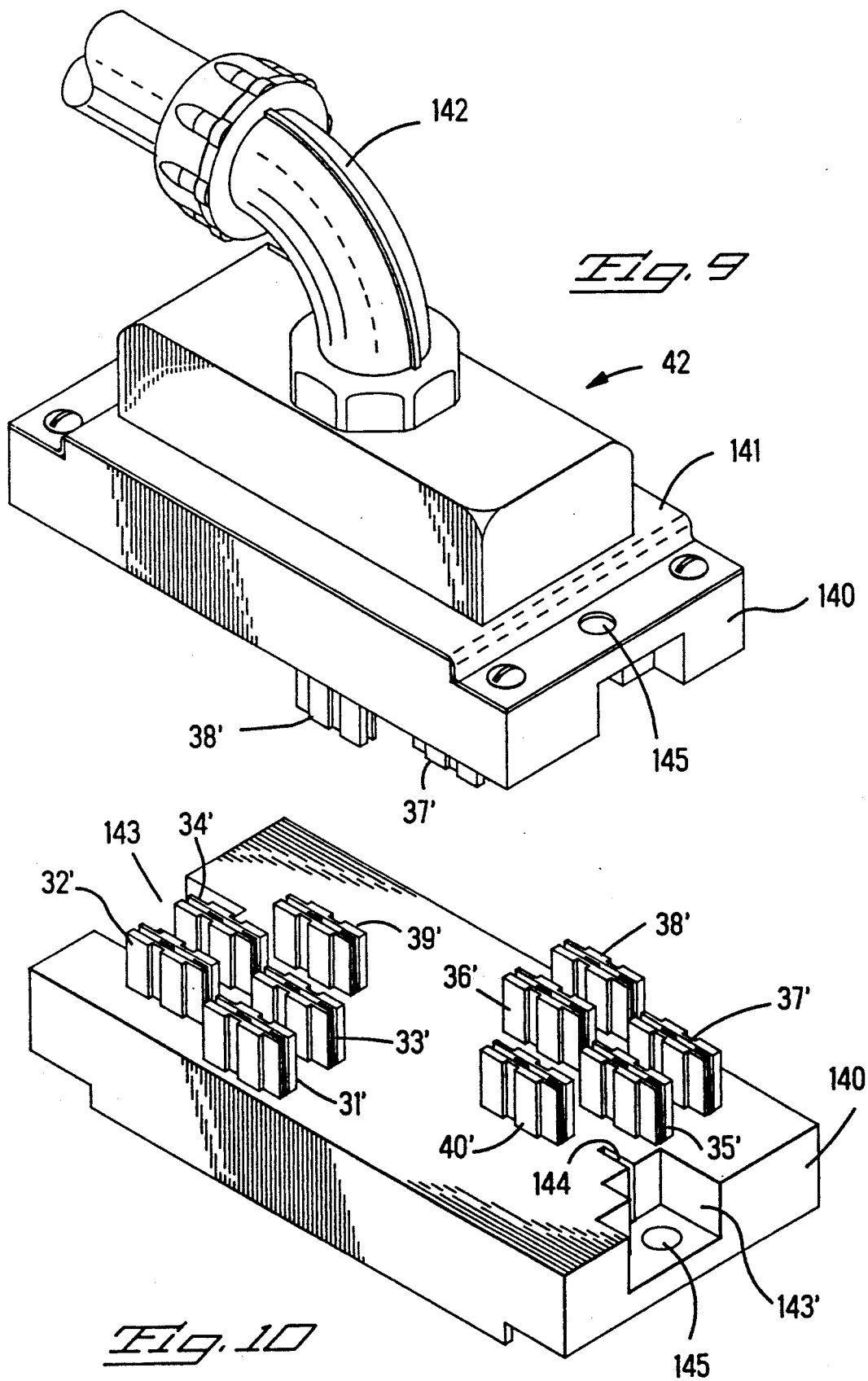

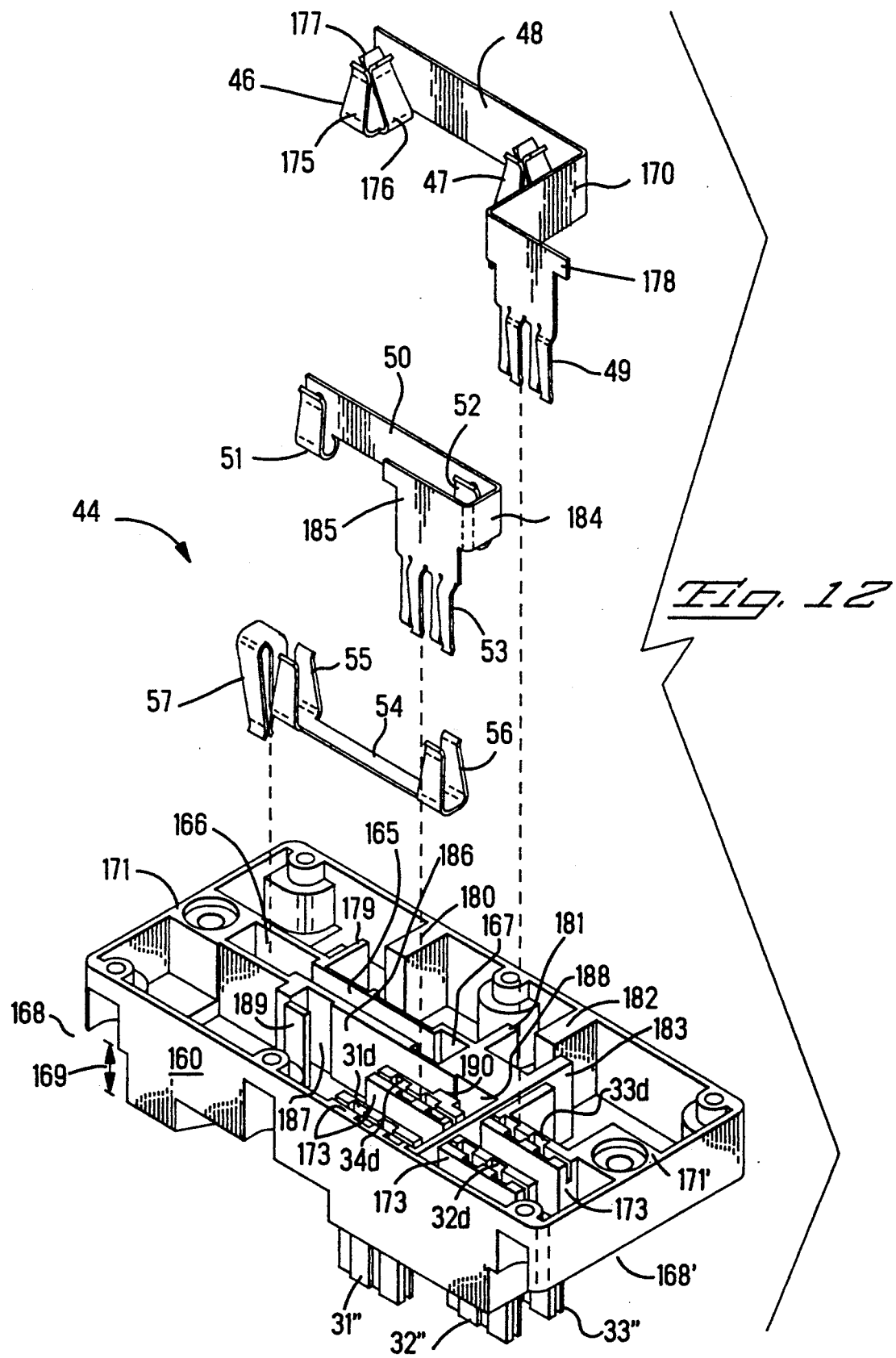

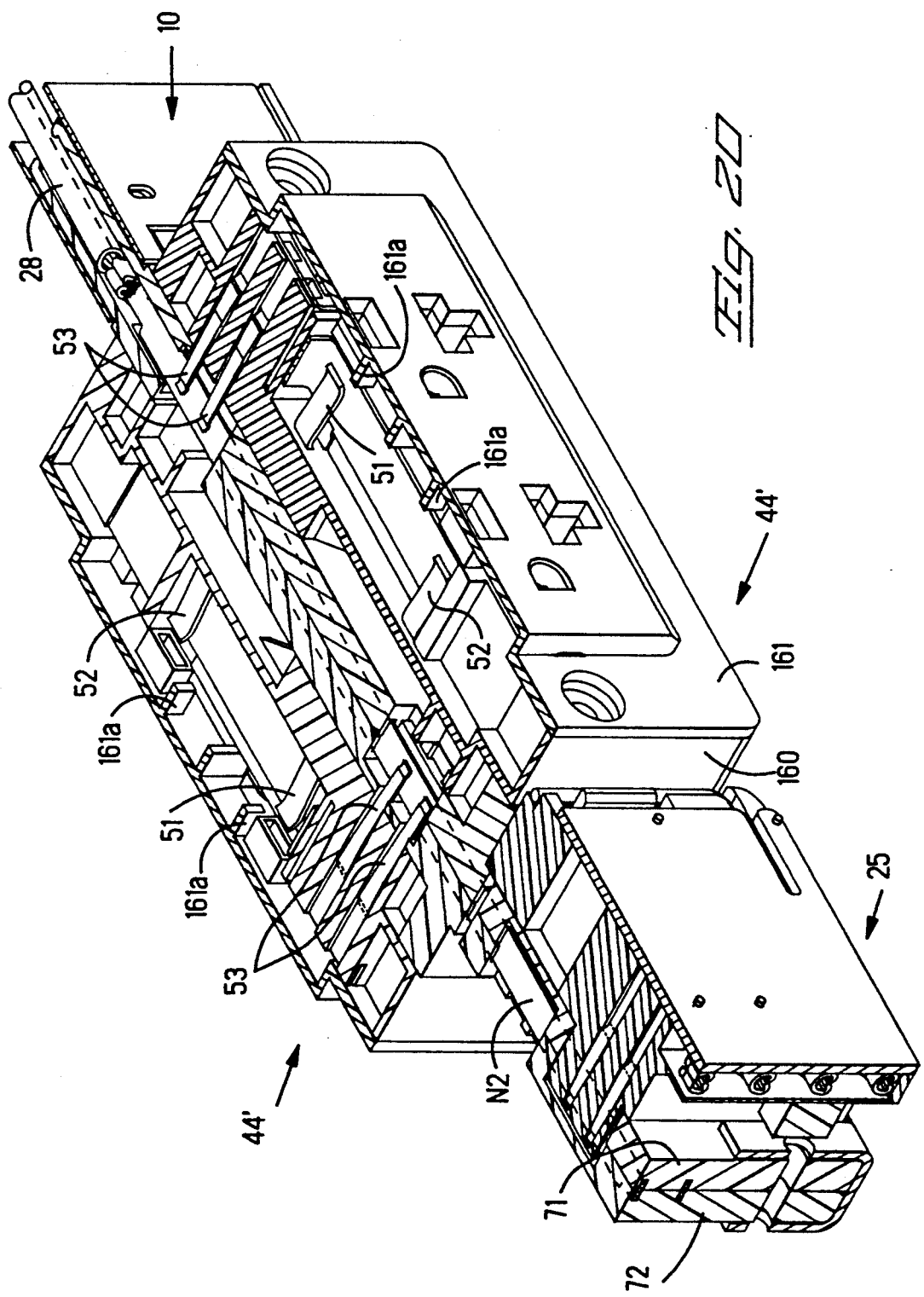

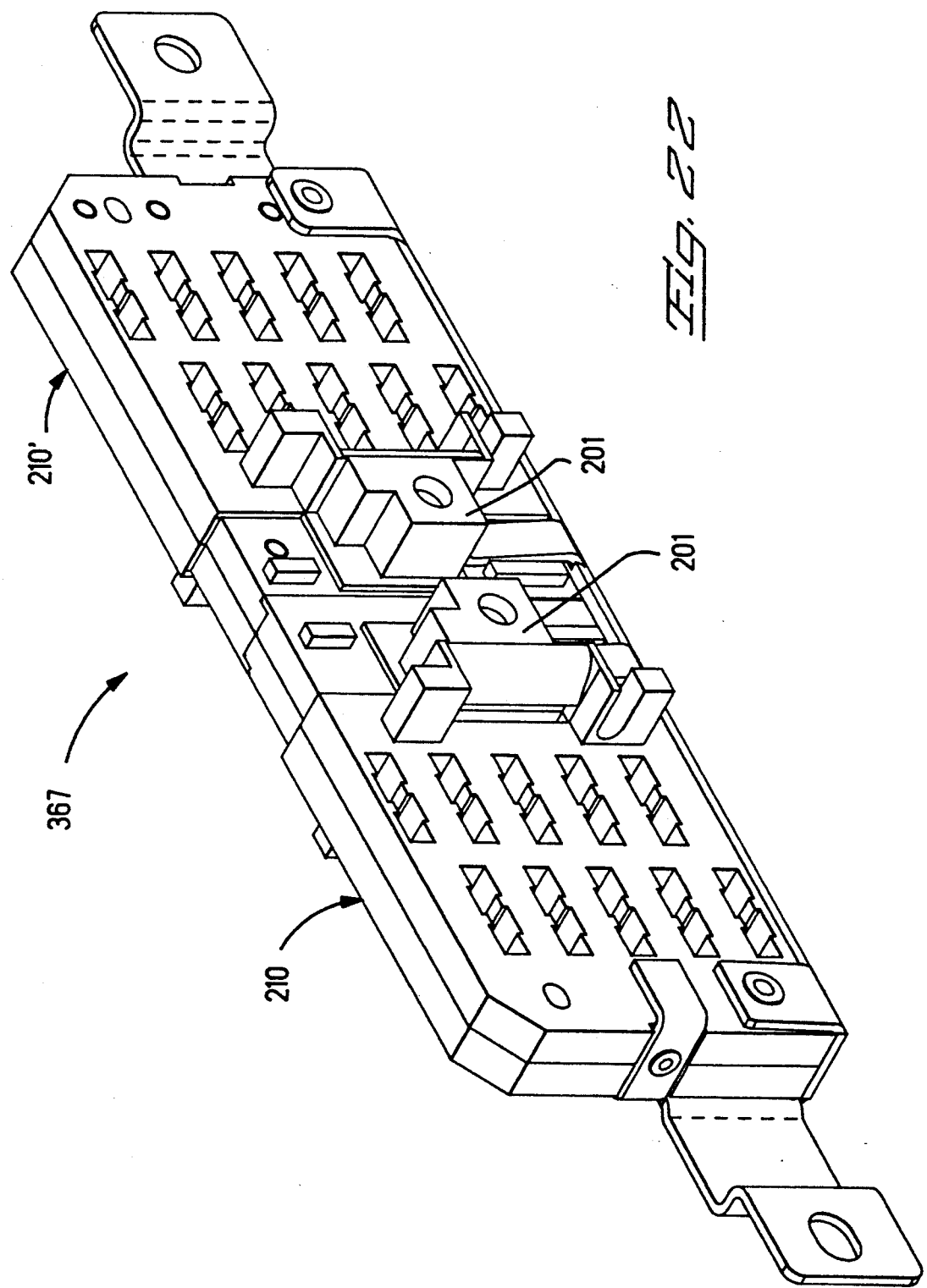

POWER DISTRIBUTION SYSTEM FOR MODULAR FURNITURE UNIT

CROSS REFERENCES TO RELATED APPLICATIONS

The present application is a continuation-in-part of co-pending U.S Pat. application Ser. No. 07/714,318, entitled POWER DISTRIBUTION SYSTEM FOR MODULAR FURNITURE UNITS, filed on Jun. 10, 1991, now U.S. Pat. No. 5,092,787 issued on Mar. 3, 1992, which is a continuation of U.S. Pat. application Ser. No. 07/539,284, filed Jun. 15, 1990, now abandoned, which is a continuation of U.S. Pat. application Ser. No. 07/394,775, filed Aug. 16, 1989 entitled POWER DISTRIBUTION SYSTEM FOR MODULAR FURNITURE UNITS, now abandoned.

BACKGROUND OF THE INVENTION

The present invention relates to the electrification of office furniture and the like, and in particular to a modular power distribution system therefore.

Modular furniture units such as for example wall panels are widely used in architectural design, especially for commercial establishments, because of the advantages they provide in ease of installation, convenience of rearrangement of floor plans after installation, attractiveness of appearance, etc. One problem encountered in the use of modular wall panels is the provision of adequate electrical power for the areas enclosed by the panels while still retaining the advantage of flexibility in the location of the panels. This problem has been answered to some extent in prior power distribution systems disclosed, for example, in U.S. Pat. Nos. 4,060,294, issued Nov. 29, 1977 and related U.S. Pat. Nos. 4,370,008, issued Jan. 25, 1983 and 4,199,206, issued Apr. 22, 1980.

In the system of the above-referenced patents, identical power blocks are secured within the bottom edge of each panel unit adjacent the opposite ends thereof. The power blocks are interconnected by three conductors running the length of the panel within the bottom edge and are adapted to receive, on either of their opposite vertical faces, panel-to-panel jumper connectors or a power-in connector through which power is supplied by a three-conductor cable from a branch circuit of the base power distribution system. The power blocks are further adapted to receive, on either vertical face, a duplex outlet connector through which outlet power is available to the areas enclosed by the panels. By these means, a duplex outlet may be provided at each of the opposite ends of a panel unit, and on both sides thereof, along the length of an indefinite run of panel units, limited by the permissible number of outlets that can be connected to a single branch circuit. When the number of outlets installed along a panel run has reached the permissible limit, it is necessary to break the continuity of the system and to begin a new run from a separate power-in connector leading from a different branch circuit of the power main.

Improvements over the three-wire power distribution system for modular panels have been devised to enable the installation of longer panel runs and the placement of a greater number of duplex outlets therein with fewer power-in connections from separate branch lines of the base power distribution system. Such improved systems are exemplified by the systems disclosed in U.S. Pat. Nos. 4,313,646, issued Feb. 2, 1982; 4,367,370, issued Jan. 4, 1983; and 4,740,167, issued Apr. 26, 1988. The systems of U.S. Pat. Nos. 4,367,370 and 4,740,167 employ power blocks at opposite ends of a panel unit which are adapted to receive connectors for panel-to-panel jumper cables, connectors for cables interconnecting the power blocks of a panel unit and for power-in cables, and duplex outlet connectors on the opposite vertical faces. In the system of U.S. Pat. No. 4,313,646, the power blocks are formed integrally with a single duplex outlet.

The feature in common of the '646, '370 and '167 patents is that each of the systems is supplied power through, and the power blocks are interconnected by, a five-wire cable. The base power distribution system may suitably comprise a three-phase system and the five wires provide three lines, one shared neutral and one safety ground. The duplex outlets may be selectively connected between any one of the three available lines and neutral. The five-wire panel distribution systems enable the installation of panel runs having more than one circuit within a panel.

To overcome the limitation imposed by the load capacity of a shared neutral conductor, U.S. Pat. No. 4,781,609, issued Nov. 1, 1988, discloses a seven-wire power distribution system for modular panels providing three lines, three neutrals, one for each of the available lines, and one safety ground.

Increasing the number of conductors in a power distribution system for a panel originally designed to accommodate a three-wire power distribution system presents a challenge as to the manner in which the additional number of conductors are to be fitted into the available space. In the system of U.S. Pat. No. 4,781,609, the power blocks contain seven vertically aligned, parallel conductive plates. Each of the plates is formed with prongs projecting outwardly from both sides of the plate and with two prongs spaced conductors. Thus, these outlets accommodate a limited number of connection variations. The problems resulting from the limited number of connection variations and the limited versatility afforded by known outlets are particularly exacerbated if the power outlets are to be capable of selecting a supply circuit from a power block having more than seven wires installed within the limited confines of existing three-wire raceways.

SUMMARY OF THE INVENTION

One aspect of the present invention is to provide a removable power outlet adapted to tap power from power circuits in a multicircuit electrical system. The system includes a first conductor associated with a first power circuit, a second conductor associated with a second power circuit and a common conductor. A power block is adapted for mounting in a utility raceway and includes a first power block contact connected to the first conductor, a second power block contact connected to the second conductor, and third and fourth power block contacts connected to the common conductor. The third and fourth power block contacts are horizontally aligned and disposed below the first power block contact and above the second power block contact. The removable power outlet includes outlet contacts connecting with the first and third power block contacts or the second and fourth power block contacts to tap power from the first or second power circuits.

In another aspect of the invention two pairs of contacts are adapted to be carried within a power outlet housing base such that the power outlet is selectively connectable to pairs of conductors in a power block, along the length of the plate projecting outwardly from opposite sides of the plate. Each of the projecting prongs is surrounded by an insulating shroud to protect against accidental contact. The vertical spacing between the plates is necessarily increased to provide space for the horizontal walls separating the vertically aligned insulating shrouds, so that the height of the power block extends substantially the entire available height of the wiring channel in the lower edge of the panel. Also, the outwardly projecting prongs and insulating shrouds increase the thickness of the power blocks, necessitating a reduction in the thickness of the duplex outlets used with the power blocks, if the faces of the duplex outlet units are to be maintained flush with the bottom edge of the panel unit.

An additional difficulty encountered when increasing the number of power supply circuits in a power block and providing a power outlet therefor, is accommodating an outlet which is selectively connectable with different supply circuits in the power block within a raceway originally designed for a three-wire distribution system. Heretofore, power outlets for connection to different ones of the supply circuits in a power block typically include a moveable connector which is adjusted to interconnect with different conductors in the power block when the outlet is assembled thereto. An alternative to power outlets having adjustable connectors use a simplex outlet with fixed connectors which is assembled to the power block at different angular orientations to connect to different circuits in the power block. Regardless of which type of selective connector is used, these outlets are utilized with power blocks having no more than seven A first pair of contacts are adapted to be assembled in the power outlet base for connection with a first or a second pair of conductors in the power block. A second pair of contacts are adapted to be assembled in the power outlet base for connection with a third or a fourth pair of conductors in the power block. Accordingly, the power outlet is adapted to tap power from at least four different pairs of conductors in the power block.

In yet another aspect of the invention, a power block housing includes first and second faces on opposite sides thereof A first array of openings on the first side of the power block extend laterally therethrough to a location adjacent the second side. A second array of openings in the second side of the power block extend laterally therethrough to a location adjacent the first side. The openings provide access to the conductors in the power block and are arranged in a vertically staggered fashion to minimize the powerway width.

The principle objects of the invention are to provide a system for modular wall panel units which provides ready access to a large number of power supply circuits in a short, thin, power block which is compact such that it fits into the utility raceway of existing office furniture units thereby achieving total compatibility and permitting retrofitting. The power distribution system has provision for plug-in components having a standard housing and including connectors which may be selectively connected to different ones of the conductors within the power block housing thereby allowing quick and easy assembly with connection to a number of different supply circuits in the raceway of existing office furniture units.

These and other features, advantages, and objects of the invention will be further understood and appreciated by those skilled in the art by reference to the following specification, claims and appended drawings.

BRIEF DESCRIPTION OF THE DRAWINGS

FIGS. 3A and 3B are isometric drawings illustrating details of the protective metal sheath covering the wires interconnecting the power blocks;

FIG. 5 is an isometric drawing of an exploded power block showing the internal construction thereof;

FIG. 9 is an isometric drawing of a front view of a base power-in connector through which the panel power distribution system is supplied power from the base power distribution system;

FIG. 10 is an isometric drawing showing a rear view of the housing of the power-in connector shown in FIG. 9;

FIG. 12 is an isometric drawing showing the interior of the housing used in both types of duplex outlet units and the placement therein of the contacts to form one of the two types of outlet units;

FIG. 20 is a longitudinal section through a power block having an outlet unit of the type shown in FIG. 14 installed in the opposite faces of the power block with both outlet units being oriented to the same hand as those shown in FIG. 15;

FIG. 21 is an alternative embodiment of the power distribution system of the present invention;

FIG. 22 is a further alternative embodiment of the power distribution system of the present invention.

DETAILED DESCRIPTION OF THE PREFERRED EMBODIMENT

Details of the construction of the preferred embodiment of the invention will next be described generally with reference to FIGS. 1-3. For purposes of illustration, the modular furniture unit is shown as a wall panel and the outlet units are shown as duplex receptacles. It is to be understood the system can be used in non-panel modular furniture units as well as wall panels. It is to be further understood that the system may be used for other receptacles such as simplex, triplex, etc. In the preferred embodiment, each panel unit in a modular wall system includes a pair of identical power blocks, 10, 10', one each positioned near the opposite ends of a panel unit within the bottom edge thereof. Each power block provides means to interconnect with adjacent wall units and generally two duplex outlet units for providing interconnection to desired electrical equipment. A base power-in connector 42, shown schematically in FIG. 4D and in detail in FIG. 9, replaces one of the duplex outlets in one panel unit to supply power for the system.

Figure 1:
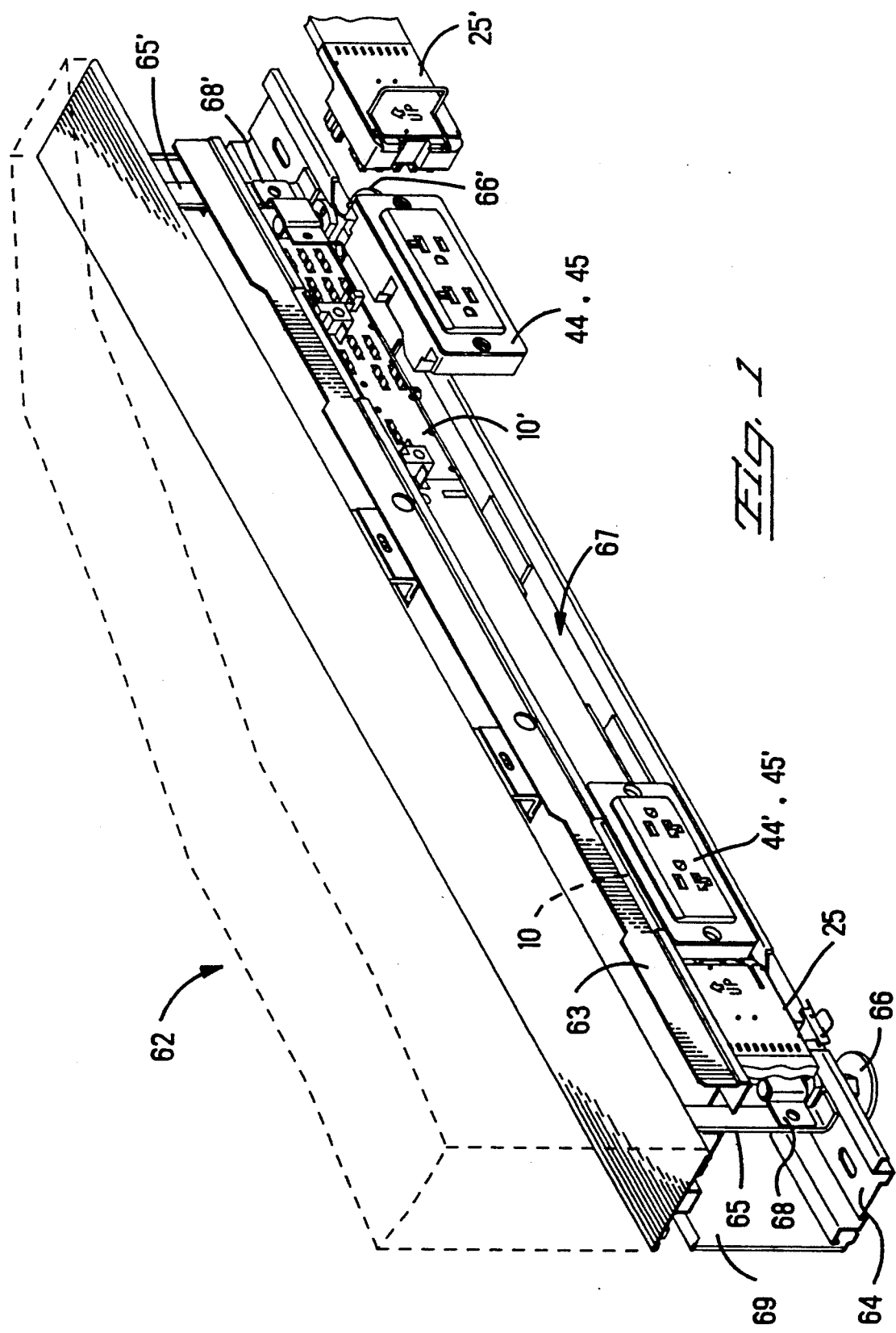
FIG. 1 is an isometric drawing of the system of the invention showing the system installed within the bottom edge of a modular wall panel unit.

FIG. 1 is an isometric drawing showing the powerway 67 of a power distribution system, or electrical system, of the invention installed within the wiring channel, or utility raceway, on the bottom edge of a typical modular wall panel unit 62. In FIG. 1, the power block at the left edge of the panels is obscured by the panel-to-panel or jumper cable connector 25 and the duplex outlet unit 44 or 45. At the opposite end of the panel, the jumper cable connector 25 and the duplex outlet unit 44 or 45 are shown separated from the power block so that the underlying power block 10' may be seen. The power blocks at each end of the panel unit are capable of receiving, on both sides of the panel, a jumper cable connector 25 and a duplex outlet unit 44 or 45.

Figure 2:
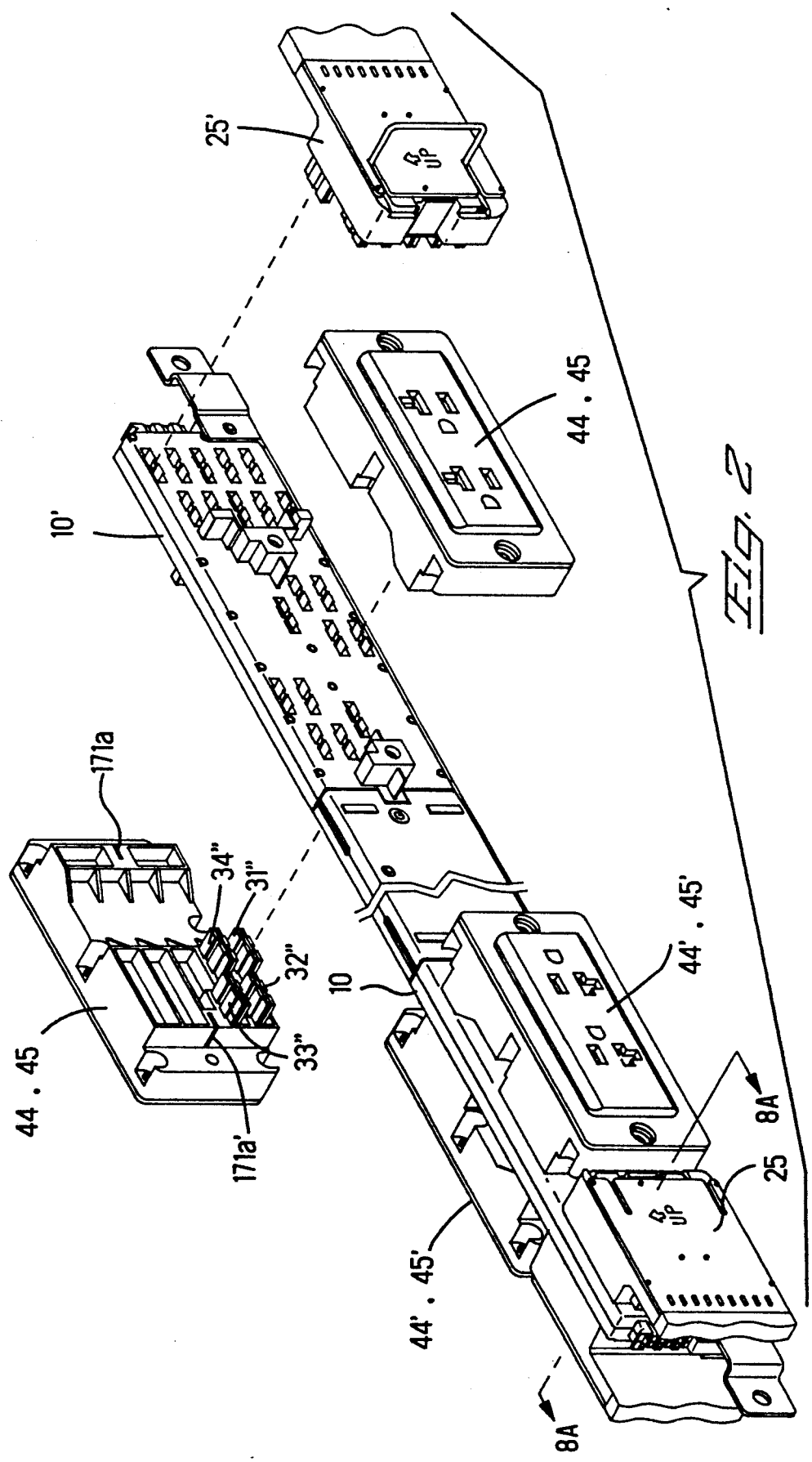
FIG. 2 is an isometric drawing of the invention showing the system as assembled prior to installation in a wall panel unit with duplex outlet units and a jumper cable connector installed in both sides of a power block at one end of the system and the placement of jumper cable connectors and duplex outlet units for installation in the power block at the opposite end of the system.

FIG. 2 is an isometric drawing showing the power distribution system removed from the wall panel unit. This figure shows duplex outlet units of either 44 or 45 installed in both faces of the left-hand power block 10 and the orientation of outlet units of either 44 or 45 for installation in both faces of the right-hand power block 10'. The orientation of a jumper cable connector 25 for installation in the front face of power block 10' is also shown. FIG. 3 is an isometric view of the system removed from the wall unit illustrating the two power units 10, 10', which are interconnected by wires (not seen) inside unit 73.

Figure 3:
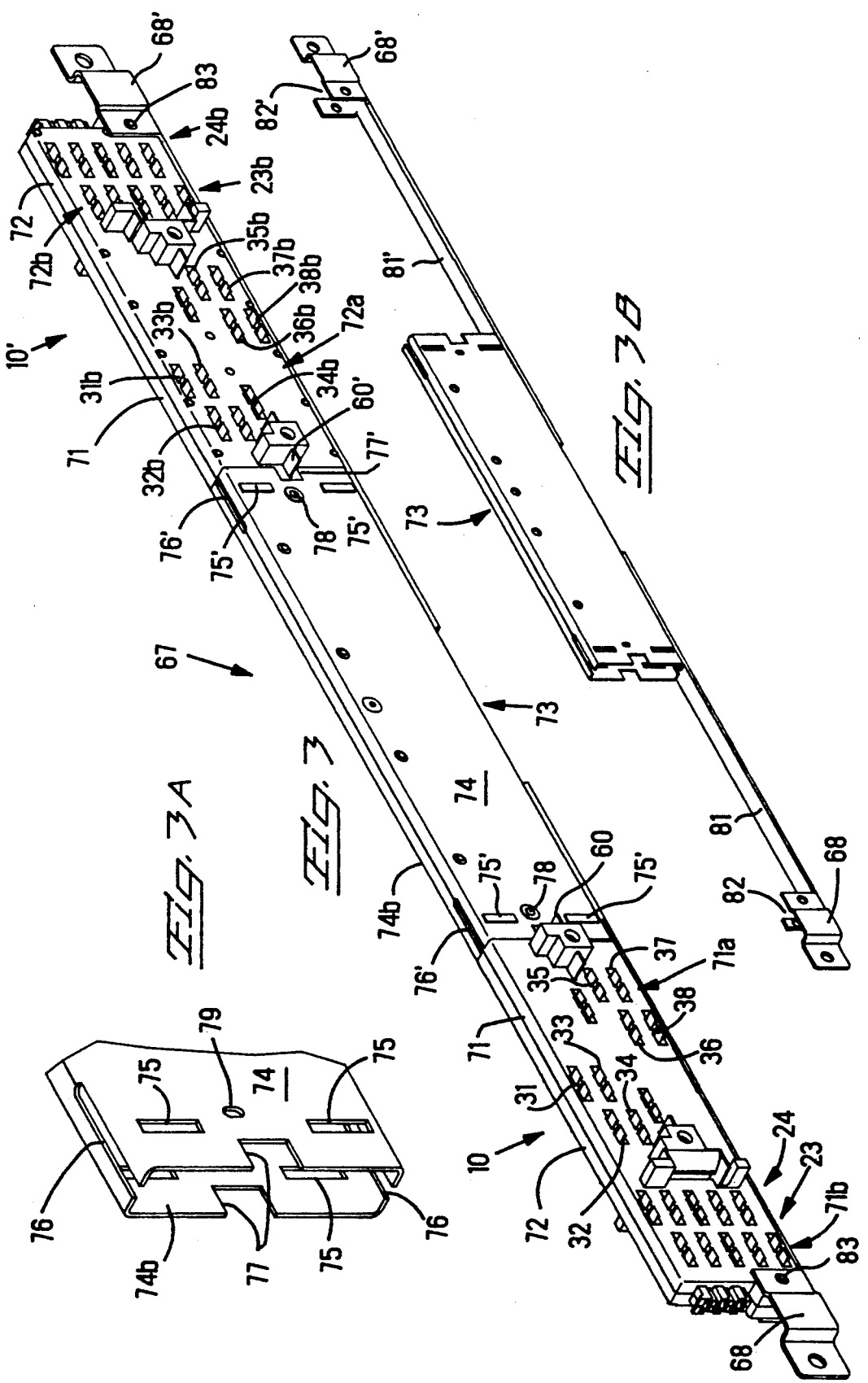
FIG. 3 is a view similar to FIG. 2 with the duplex outlet units and cable connectors removed from the power blocks.
Figure 4:
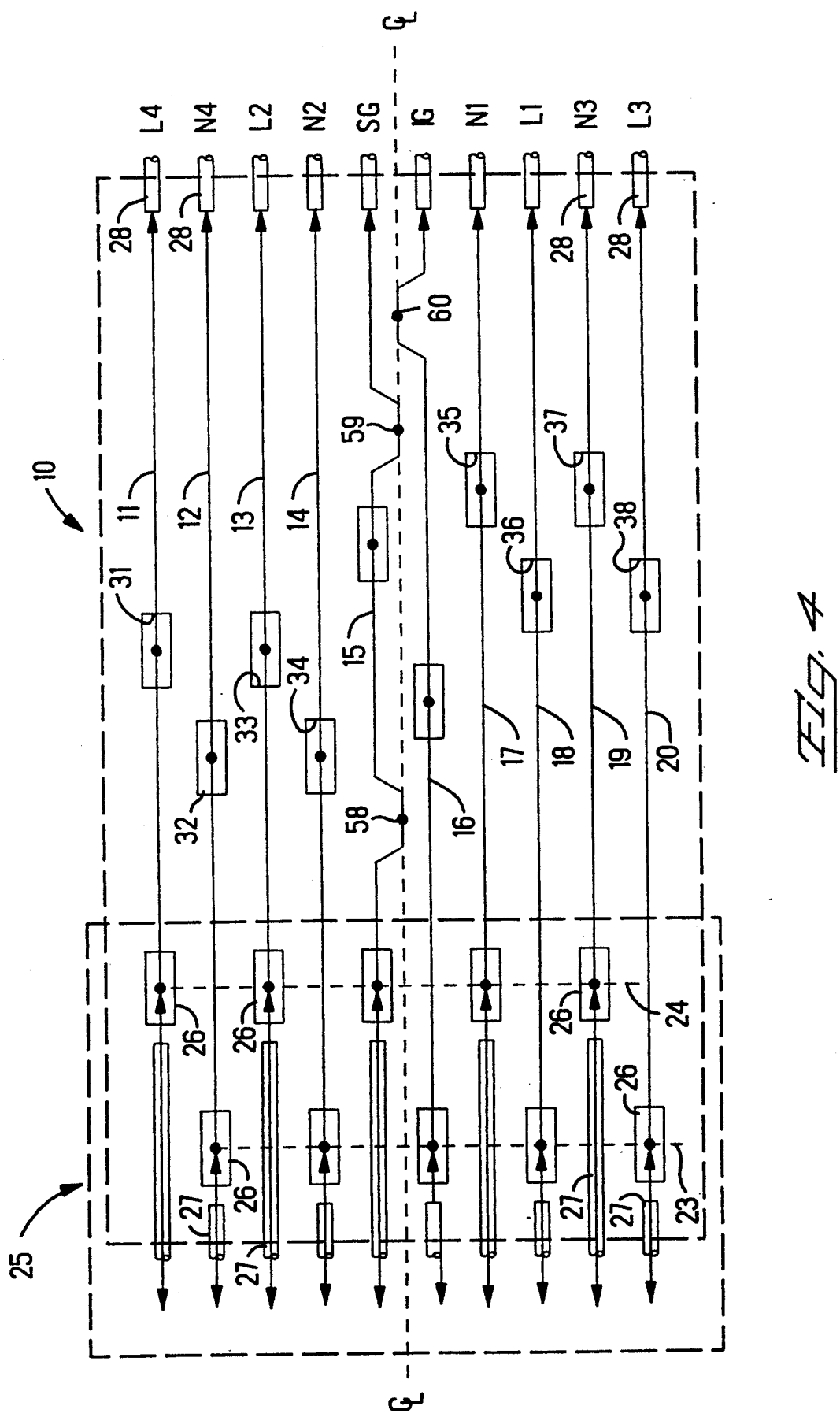
FIGS. 4 and 4A–4C are schematic diagrams of the power distribution system of the invention.
Figure 4A:
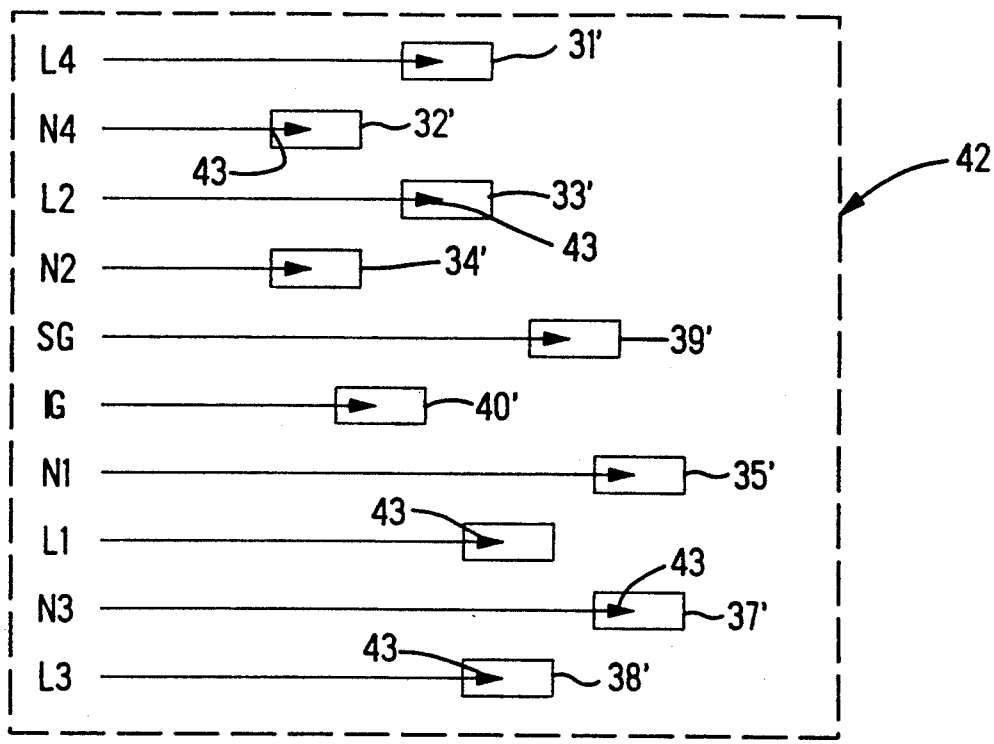
Figure 4B:
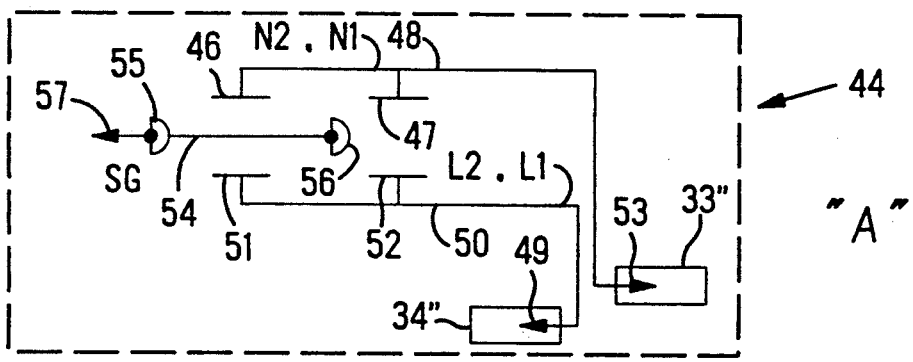
Figure 4C:
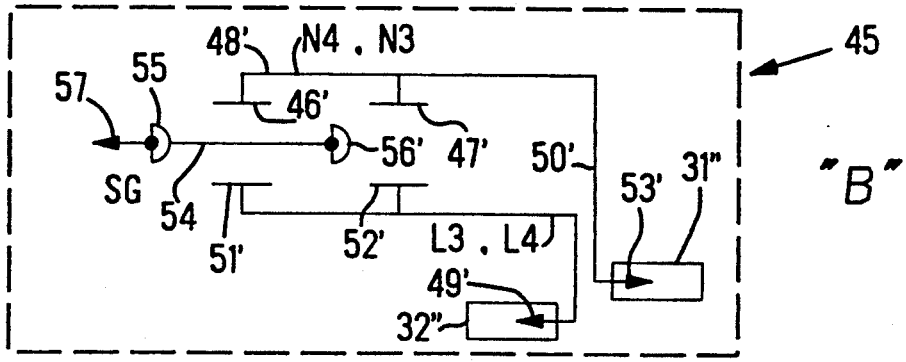
Figure 4D:
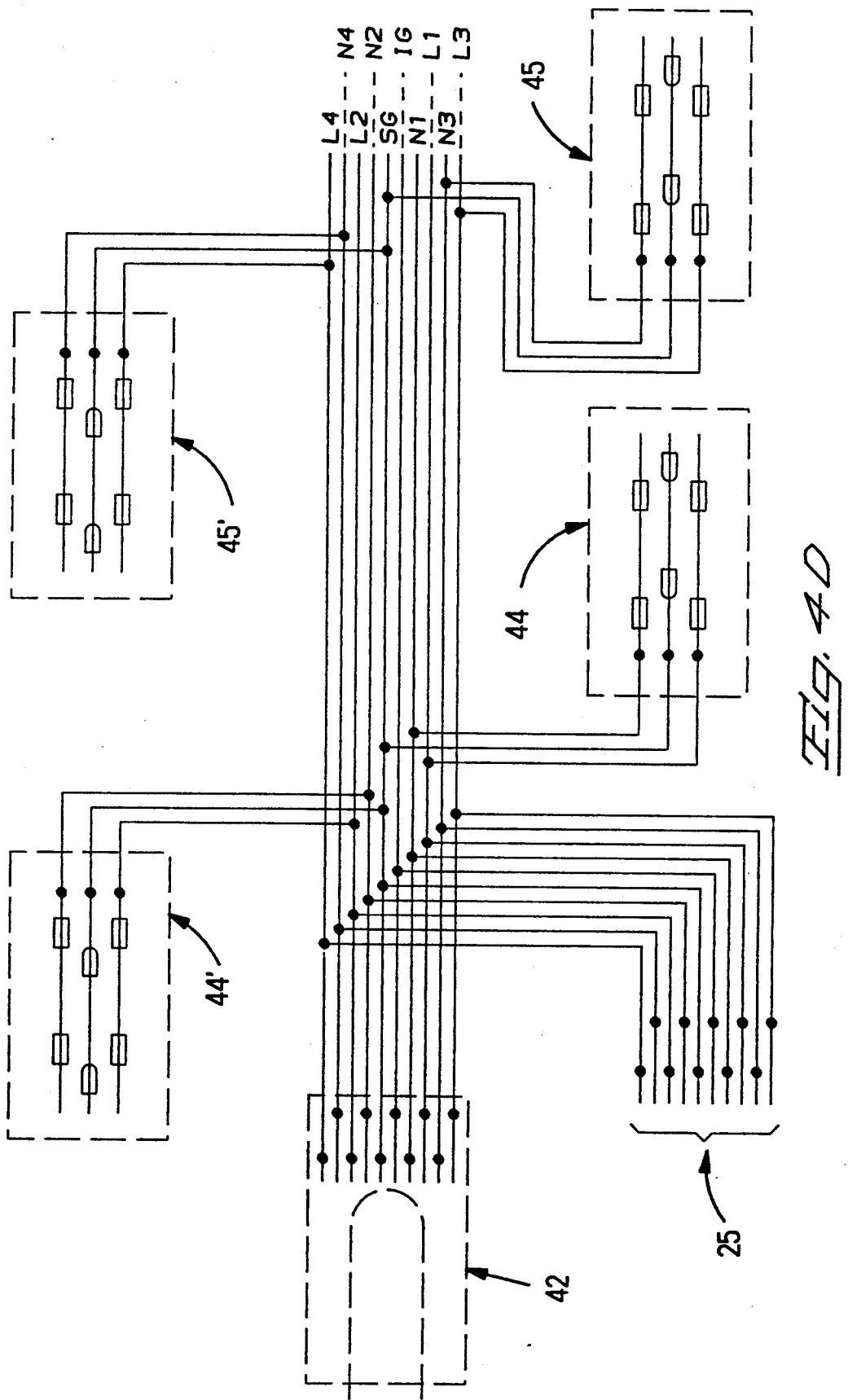
FIG. 4D is an electrical schematic diagram of the power distribution system.

Reference is now made to FIGS. 3, 4, 4A-4D, 5 and 6. A schematic diagram showing the electrical connections that can be made at one end of a modular wall panel unit in the ten-wire power distribution system of the invention is shown in FIGS. 4 and 4A-4C. FIG. 4D is an electrical schematic diagram of the system. As previously described, the system includes two identical, oppositely directed power blocks 10, 10'. The power block housings are molded from insulating material in two mating-half sections 71, 72. Housing sections 71, 72 are sometimes referred to hereinafter as the "front" and "rear" housing sections, respectively. In FIG. 3, the front housing section 71 of power block 10' faces forward, while the rear housing section 72 of power block 10' faces forward. The two mating halves 71, 72 of the power block form a thin, elongated box when assembled.

The wires 28, shown schematically in FIGS. 4 and 4D, interconnecting like ones of the bus bars of power blocks 10, 10' are covered by a protective metal sheath 73 which spans the width of the panel unit separating power blocks 10, 10', as best seen in FIG. 3. Sheath 73 is preferably formed from a single piece of metal which has been formed into a pair of upwardly extending sides 74, 74b each of which includes slots 75, 76, best seen in FIG. 3A for receiving complimentary ridges 75', 76' molded on the facing ends of power block housing sections 71, 72 (FIG. 5) and slots 77, which isolates sheath 73 from ground tangs 60, 60'. Several of the ridges 75' and a half portion of one of the ridges 76' are best seen in FIG. 5. The slots 75, 76 and the ridges 75', 76' inserted therein locate sheath 73 properly with respect to power blocks 10, 10' and increase the rigidity of assembly 67 when the sheath is assembled to the power blocks by fasteners 78 passed through holes 79 at the ends of sheath sections 74, 74b and aligned holes (not shown) at the ends of power block housing sections 71, 72.

The rigidity of assembly 67 is further increased by brackets 81, 81' (FIG. 3B) which include upstanding U-shaped brackets 82, 82' at the far ends thereof formed as part of assembly mounting brackets 68, 68'. Brackets 81, 81' are attached to the lower edge of sheath 73 at the opposite ends thereof and are attached to the far ends of power blocks 10, 10' by fasteners 83 passed through holes in brackets 82, 82' and through aligned holes at the ends of power block housing sections 71, 72. Mating holes for receiving fastener 83 in power block 10 are shown in FIG. 5 at 84, 84b.

Figure 6:
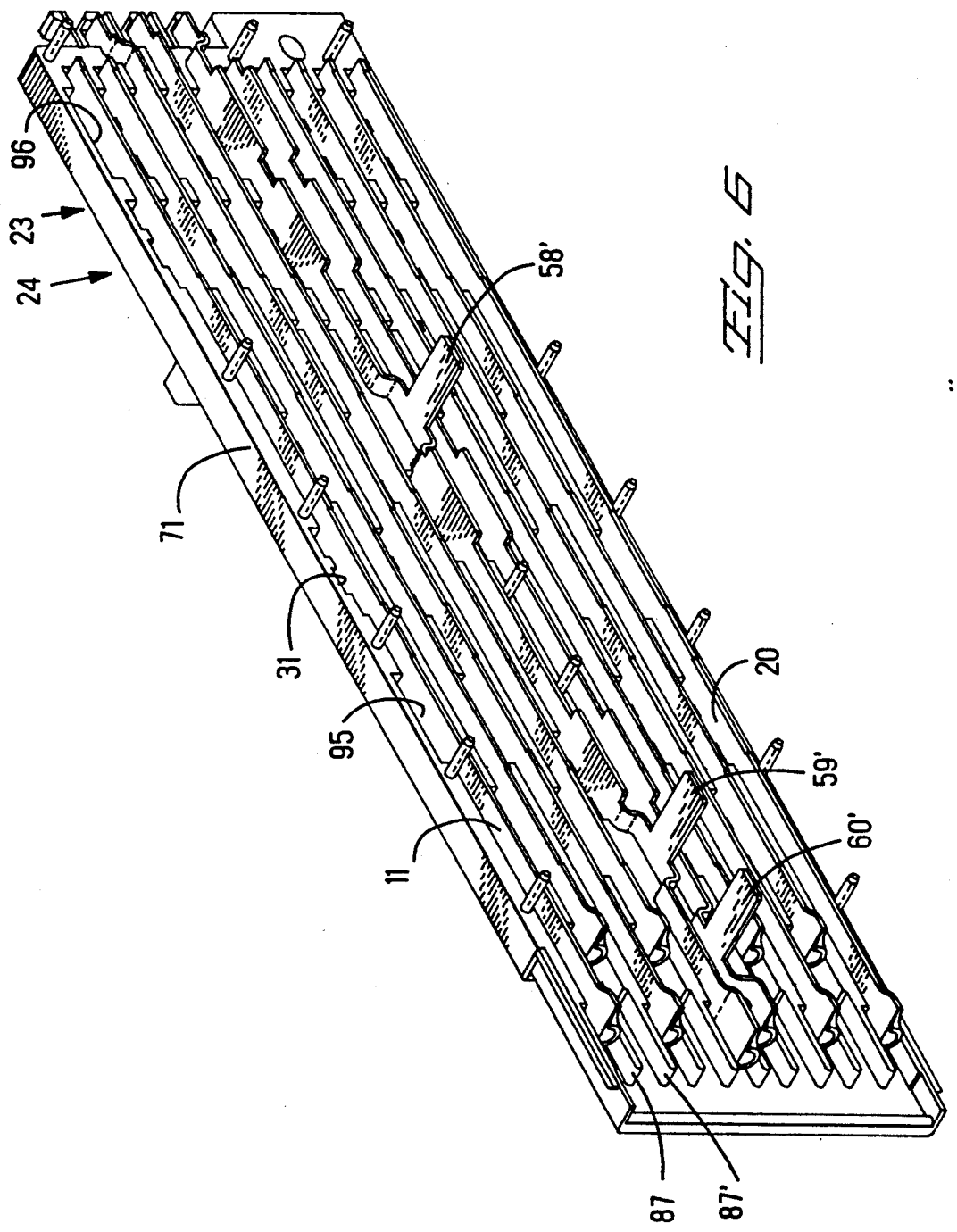
FIG. 6 is an isometric drawing showing one-half section of a power block with bus bars installed therein.
Figure 6A:
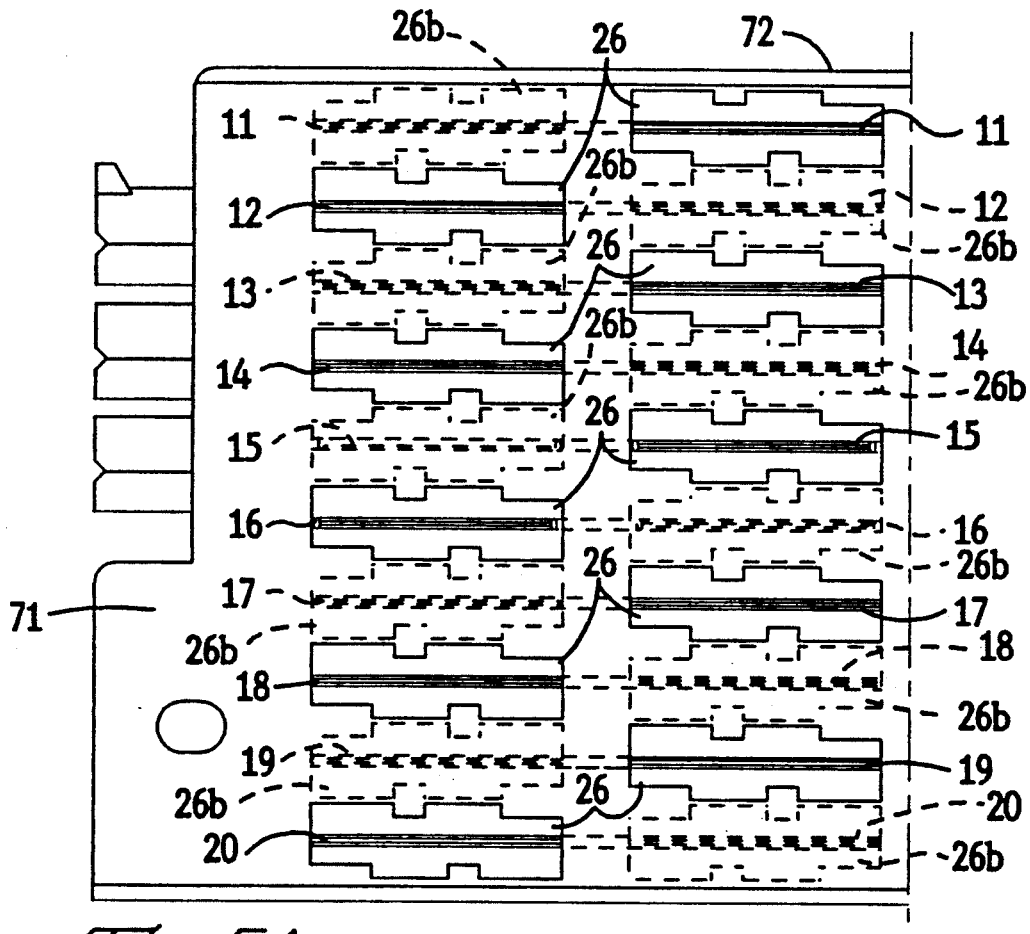
FIG. 6A is a fragmentary portion of the assembled power block illustrating the arrangement of the openings on the opposite faces thereof, with the arrangement of the openings on the rearward face being in phantom.

As best seen in FIGS. 5, 6 and 6A and represented schematically in FIGS. 4 and 4D, power block 10 contains ten parallel, vertically aligned bus bars 11-20. Access to these bus bars is provided by a series of openings in each of the housing halves 71, 72. One end of each half of the power block housing is pierced by ten openings arranged in two vertically aligned columns 23, 24 of five openings each. The openings of columns 23, 24 in the face of the power block housing, as well as other openings later described, do not extend completely through both halves of the housing.

It is to be particularly noted that the chirality or handedness of the patterns of openings in the face of housing half 71 is preserved in the face of housing half 72, as best seen in FIG. 3. That is, the column 23 of openings lies to the left of openings column 24 in housing half 71 and the openings of column 23 are opposite the even-numbered ones of bus bars 11-20. Similarly, in housing half 72, the column 23b of openings, corresponding to column 23, lie to the left of openings column 24b and the openings of 23b are opposite the even-numbered ones of bus bars 11'-20' of power block 10', corresponding to bus bars 11-20 of power block 10. Also, the chiralities of the patterns of openings 31-34 and 35-38 of power block 10 and the patterns of corresponding openings 31b-34b and 35b-38b of power block 10' are the same. This preservation of chirality in the patterns of openings in the opposite faces of the power block housing enables any of the plug-in components of the system to fit in either face of the power block. It is to be noted, however, that while the patterns of openings in the housing halves 71, 72 have the same chirality, the housing halves 71, 72 are not, in themselves, right or left handed. The same members 71, 72 form both of the power blocks 10, 10'.

FIG. 5 is an exploded isometric view of power block 10 and FIG. 6 is an isometric view of the interior face of power block housing section 71. The ends of bus bars 11-20 of power block 10 facing the similar ends of the corresponding bus bars of the power block 10' at the opposite end of the panel unit are interconnected by ten insulated wires 28 extending in parallel across the width of the panel unit. As is shown in FIG. 5, the right-hand ends of bus bars 11-20 are each formed with crimp terminal 86 for attachment to the end of the wire 28 interconnecting the like bus bar in the power block at the opposite end of the panel unit. The odd-numbered ones of the bus bars 11-20 are slightly longer than the even-numbered ones so that each of the ten terminals 86 becomes alternately disposed in one of two vertically aligned columns, each of which contains five terminals 86. Preferably the bus bars are stamped from copper or a copper alloy and the edges of the bus bars are chamfered to facilitate mating of the contact members with the bus bars.

Referring now to FIGS. 5 and 6, bus bars 11-20 respectively fit into parallel channels 11b-20b of the rear-half section 72 of the power block housing to a depth of half the width of the bus bars. Each of the channels 11b-20b diverges into an open-ended trough 87 or 87'. The odd-numbered ones of the bus bars 11-20 are slightly longer than the even-numbered ones and channels 11b-20b alternate correspondingly in length so that each of the troughs 87' is longer than each of the troughs 87. The terminals 86 of the longer ones of bus bars 11-20 are disposed in the shorted troughs 87 while the terminals 86 of the shorter ones of the bus bars are disposed in the longer troughs 87'. Front housing section 71 contains channels corresponding to and coincident with channels 11b-20b into which bus bars 11-20 fit to the remainder of their width when housing sections 71, 72 are assembled. FIG. 6 shows bus bars 11-20 seated in the channels of housing section 71 corresponding to channels 11b-20b of housing section 72.

FIG. 6A is a fragmentary assembled portion of power block 10 illustrating the pattern of openings of rows 23, 24 of housing section 71 and the pattern of openings 23, 24 on the outward face of housing section 72. For purposes of clarity, only the outline of the openings and those portions of the bus bars 11-20 accessible through the openings are shown in FIG. 6A. The openings and bus bars accessible from rearward face 71 are shown in phantom. As can be seen in FIG. 6A, the openings in column 23 provide access to the odd numbered bus bars and the openings in column 24 provide access to the even-numbered bus bars.

FIG. 6A clearly illustrates the internesting of the openings from the opposite faces of the power block. Openings 26 are arranged in two columns 23, 24 (FIG. 6) in the front face and openings 26b are arranged in two columns 23b, 24b in the back face. Column 23 is aligned with column 23b and column 24 is aligned with column 24b when the front and back housing sections 71, 72 are assembled to minimize the length of the power blocks 10, 10'. Openings 26 which provide access to bus bars 11, 13, 15, 17 and 19 through the front face are laterally offset from openings 26 which provide access to bus bars 12, 14, 16, 18 and 20 through the front face. Openings 26 are vertically staggered from openings 26b which provide access to bus bars 11-20 through the back face. This internesting of the front and back openings provides access to the conductors 11-20 through the front and back faces at vertically staggered locations, such that plug-in units assembled to the power block through the front and back sections connect to the conductors in the power block at adjacent locations. A large number of conductors are accordingly accommodated within a thin power block which fits within the limited confines of raceways of existing furniture units.

Again referring to FIG. 5, the left-hand ends of bus bars 13, 14, 15 are formed with narrowed tangs 88, 89, 91 which project outward beyond the vertical edges of 92, 92b of housing sections 71, 72. Tangs 88, 89, 91 are surrounded by an insulating silo molded in mating half-sections 93, 93b on the vertical edges 92, 92b of housing sections 71, 72. Silos 93 are contoured to mate with an L-shaped plug at the end of a three-wire cord extending upwardly within the vertical edge of a wall panel unit. Neither the plug nor the cord is shown in the drawings. The plug connects two of the cord wires, through tangs 88, 89 to bus bars 13, 14 for supplying power from L2, N2 circuit of the system to a lighting fixture or other device located along the top edge of the panel unit. The third wire of the cord is connected by the plug, through tang 91, to bus bar 15 for grounding the fixture.

Short tangs 193 project laterally from the facing edges of bus bars 11, 12, 14 and 16-20 to fit into detent recesses (not shown) in housing section 71 for longitudinally locating and restraining the respective bus bars in the channels of housing section 71 corresponding to channels 11b, 12b etc. Bus bar 13 is longitudinally located and restrained in channel 13b of section 72 and the channel corresponding to 13b in section 71 by the upward bend in the bus bar adjacent tang 88 which fits into conforming bends in channel 13b and the channel opposite thereto in section 71.

Bus bar 15 is formed with two downward offsets spaced along its length to move the plane of the portions of the bus bar within the offsets onto the longitudinal center lines of sections 71, 72. Tangs 58, 59 project outward from the facing sides of the offset portions bus bar 15, as seen in FIG. 5. As illustrated in FIG. 4, tangs 58 and 59 project outwardly at the vertical center of power block 10 represented by centerline $C_L$. Tangs 58, 59 could be located off the vertical centerline so long as the following conditions are met: the distance between the centerline $C_L$ and each of the tangs 58, 59 is the same; the distance from tangs 58, 59 to power conductors 10, 20 is the same; the distance from tangs 58, 59 to neutral conductors 11, 19 is the same; the distance from tangs 58, 59 to power conductors 12, 18 is the same; the distance from tangs 58, 59 to neutral conductors 13, 17 is the same; and tangs 58, 59 do not contact bus bar 16. However, in the preferred embodiment, tangs 58, 59 are located on the centerline $C_L$ so that tangs 58, 58' extend from the same offset portion and tangs 59, 59' extend from the same offset portion as described below.

As best illustrated in FIG. 6, tangs 58', 59' and tangs 58, 59 project outwardly from the opposite sides of the offset portions of bus bar 15. Tangs 58' and 59' also project outwardly along the vertical center of block 10. Tangs 58', 59' extend through slots 94 in the faces of housing sections 71, 72 wherein they are exposed for engagement by a ground contact of a duplex outlet unit 44 or 45, as described hereinafter. Only one of the slots 94 is in FIG. 5. Because tangs or connectors 58, 58', 59 visible in FIG. 5. Because tangs or connectors 58, 58', 59 and 59' are located at the vertical center of block 10, a contact 57 (FIGS. 12 and 13) at the vertical center of a power outlet 44, 45 connects with bus bar 15 when the power outlet is electrically connected to all four power supply circuits in power blocks 10, 10' as described in greater detail hereinafter. Bus bar 15 is connected to safety ground and thus a single safety ground conductor is provided in the power block for all the power and neutral conductors 11-14, 17-20 (P1-P4 and N1-N4). The height of the power block 10, 10' which houses the bus bars 11-20 is accordingly minimized for the number of power and neutral bus bars in the power block.

An upward offset is formed in a portion of bus bar 16 near the end connected to one of the conductors 28 to move the plane of the offset portion onto the center lines of housing sections 71, 72. Tangs 60, 60' project outward from the opposite sides of the offset portion of bus bar 16 through slots 77 in the faces of housing sections 71, 72, as shown in FIG. 3. Tangs 60, 60' provide access to the isolated ground conductor of the system for contacts of a specialized plug-in component (not described herein) used to supply power to electronic equipment requiring a dedicated ground conductor.

As shown in FIGS. 1-3, 5 and 6A, the openings of columns 23, 24, 31-40 in the face of housing section 71 for receiving the male contacts of the various plug-in components are formed with a crenellated or notched periphery to protect against accidental contact with the bus bars accessible through such openings. The male contacts of the plug-in components which engage the bus bars through such openings are each surrounded by insulating silos, as seen on components 44, 45 in FIG. 2, having outlines of complementary form to the outlines of the openings, also for the purpose of protecting against accidental contact with the male contacts during installation of removal of the plug-in component These safety features will later be more fully described. The outline form of the openings is mentioned at this time because wherever a recess with a notched wall is shown in one of the housing sections 71 or 72 in FIGS. 5 and 6, it is indicative that recess is open to the face of the housing in which it is shown.

For example, opening 31 in the face of housing section 71 is formed with a notched wall. When housing section 71 is assembled to housing section 72, a straight-walled cavity 31c in housing section 72 lies directly opposite opening 31. Cavity 31c is closed at the bottom and is provided to receive the portion of the insulating silo of a male contact extending over bus bar 11 when a male contact is inserted through opening 31. Similar straight-walled cavities, such as 32c, 37c and 38c, are positioned in housing section 72 directly opposite the openings in the face of housing section 71. Only a few of such cavities have been labelled in FIG. 5. Straight-walled cavities corresponding to cavities 31c, 32c etc. are positioned in housing section 71 directly opposite the openings 31b, 32b etc. in housing section 72. The cavities of section 71 are only partially seen in FIG. 6 at 95, 96. The internesting of the openings and respective cavities are shown in FIGS. 6A, 8A, 15-19.

Mounting posts 101 and 102 (FIG. 5) for securing in place either a duplex outlet unit 44 or 45, or a base power-in connector 42 project outward from the face of housing section 71. Posts 101 and 102 fit into complementary recesses in the rear face of the housing for a duplex outlet unit and in the rear face of a power-in connector. Posts 101 and 102 are formed with a step 103 molded into the upper facing corners thereof for polarizing a power-in connector 42 when such a component is installed in the power block. The right-hand side of post 101 is formed with upper and lower wings 104, 105 which are offset longitudinally from the portion of post 101 of similar shape to post 102. The side wall of post 101 connecting wings 104, 105 is formed with a stepped ramp 106 which serves as a strike for a latch toggle formed on the end of the housing of a connector 25, as later described. Posts similar to posts 101 and 102 are molded onto the face of housing section 72, except that the post on section 72 similar to post 101 will be seen to the right and the post similar to post 102 will be seen to the left when section 72 is viewed in elevation.

Figure 7:
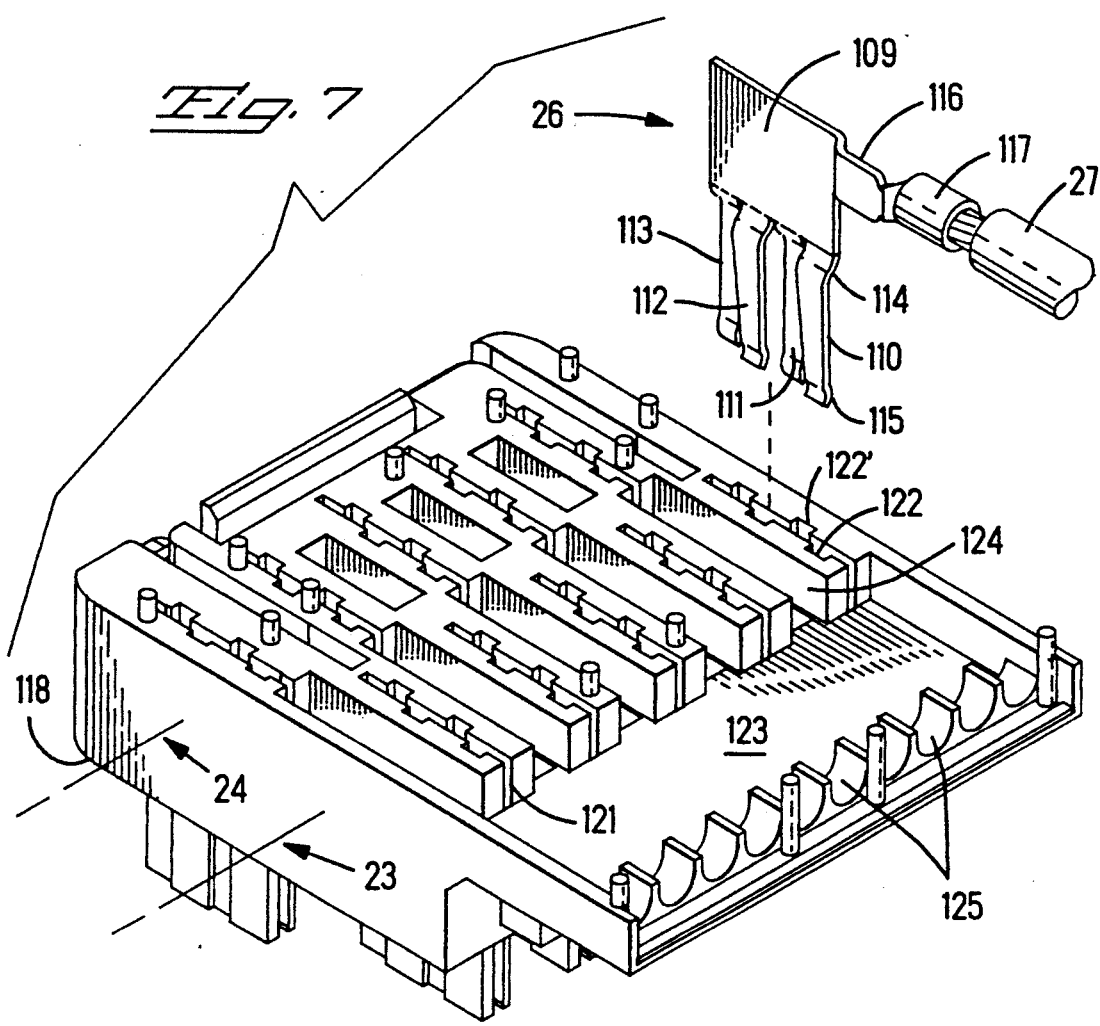
FIG. 7 is an isometric drawing of a front view of the housing of a jumper cable connector with the cover plate removed.

Details of the construction of plug-in panel-to-panel component 25 will be described with reference to FIGS. 3, 4, 4D, 7, 7A and 8. As shown in FIGS. 3 and 4, the openings of columns 23, 24 are aligned with alternate ones of the bus bars 11-20 to enable the individual engagement of each of the bus bars by ten separate male contacts 26 carried by a plug-in connector 25 for a flexible ten-wire panel-to-panel jumper cable 126, as best seen in FIGS. 7 and 8. The male contacts of connector 25 extend outward from the rear face of the connector housing and each contact is enclosed by an insulating silo dimensioned to fit with minimum clearance within the openings of the power block housing. Each of the male contacts 26 of connector 25 is connected by a separate one of the conductors 27 of the jumper cable 126 to a similarly situated male contact of an identical connector (not shown) at the opposite end of the jumper cable. The panel-to-panel jumper cable connections between the power distribution systems of adjoining wall panel units establishes circuit continuity between the panel units with the bus bars of all the power blocks of the system all having the same order of vertical array.

Referring now to FIGS. 7 and 8, which illustrate panel-to-panel or jumper cable connector 25, particularly to FIG. 7, which best shows a male contact 26 of the same general configuration used in all plug-in components of the system. Contact 26 preferably is stamped and formed from a strip of resilient conductive alloy of generally rectangular shape and having the desired electrical and mechanical properties as known in the art. The lower portion of the strip is formed into four parallel fingers 110–113 depending from a back beam 109. Each of the fingers 110–113 is bent out of the plane of beam 109 to form a spring arch 114 at the base of the finger which biases the free ends 115 of the fingers back into the plane of beam 109 when the finger ends are displaced therefrom. The directions of the bends of arches 114 alternate from side to side of the plane of beam 109 along with length of the beam. The tips of the free ends of the fingers are bent outward from the plane of beam 109 to facilitate passage of the fingers over the edge of a bus bar in one of the power blocks of the system when brought into contact therewith. Upon engagement with a bus bar, the fingers 110–113 alternately extend over and exert pressure upon the opposite surfaces of the bus bar, which then becomes threaded through the fingers along the plane of beam 109.

The form of construction of the contacts 26 is conservative of space and provides the further advantage that the reaction forces of the fingers 110–113 upon beam 109, when the fingers are in engagement with a bus bar, generate counterbalancing torques within beam 109. Therefore, upon engagement with a bus bar, the contacts do not exert any reaction force upon the housing in which the contacts are mounted and do not depend upon such reaction forces for the maintenance of contact pressure upon the bus bar. Thus, the contact pressures do not lessen because of minor changes in the housing dimensions resulting from relaxation of the housing. The contacts 26, and similar contacts of the system that are attached to wire conductors, are formed with a tab 116 projecting laterally from the upper edge of beam 109 and having a crimp terminal 117 fashioned on the end for attachment of a wire 27.

Figure 7A:
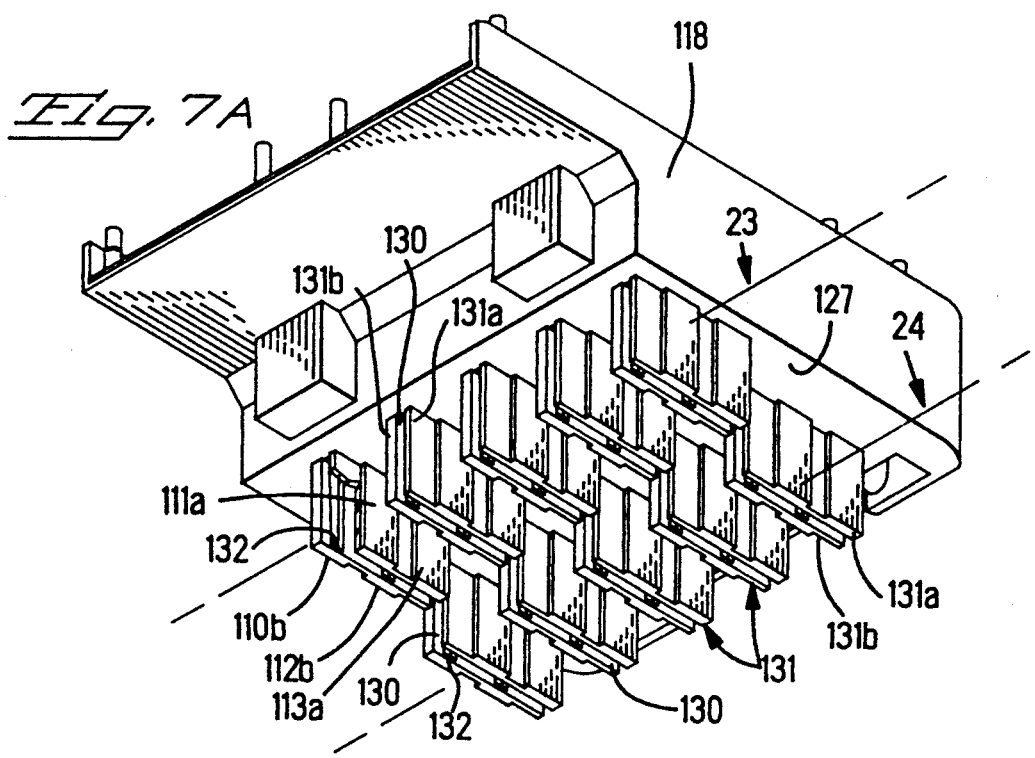
FIG. 7A is an isometric drawing of a rear view of the housing shown in FIG. 7.

Referring now to FIGS. 7, 7A and 8, the housing of connector 25 is comprised by a body section 118 and a cover plate 119, both molded from insulating material. The interior of body section 118 contains ten slots 121, arranged in two parallel columns 23, 24 corresponding to the openings in power block 10, each column having five slots each, for receiving the ten contacts 26. The slots 121 are open along the lengths of their bottoms through the rear face of housing section 118 and are open at the end to the interior of section 118. The sides of slots 121 are grooved, as at 122, 122', to provide clearance for the spring arches 114 of the contact fingers 110–113 when a contact 26 is inserted therein. The ends of the slots of column 23 open into the edge of a box-like cavity 123 at the end of body 118 adjacent the jumper cable. The slots of column 24 open into the ends of channels 124 which extend in parallel between the slots of column 23 into the edge of cavity 123. The outer edge of cavity 123 is finished with ten aligned U-shaped spacers 125. Which maintain the ten wires 27 in parallel alignment after installation of contacts 26, with the wires 27 attached, into body section 118. The portion of the wires 27 extending between connectors 25, 25' at the opposite wire ends are encapsulated in a flexible polymer material to form a flat cable 126, as shown in FIG. 8.

As previously discussed with reference to FIGS. 3 and 5, the openings for receiving jumper cable contacts 26 in column 23 are to the left of those identified in column 24. To ensure electrical continuity between adjacent furniture units, connectors 25, 25' include polarizing features such that connector 25 can only be received in side power blocks 10, 10' and connector 25' in side 72 of the power blocks 10, 10' thus giving "right handed" and "left handed" connectors. Once connectors 25, 25' are terminated to cable 126, however, the "handedness" in effect disappears in that cable 126 can be used on either end of the panel 67 and on either side. For purposes of assembly, the covers of respective connectors 25, 25' are marked with an arrow to indicate geometric orientation.

Referring to FIGS. 7 and 7A, the fingers 110–113 of each of the contacts 26 extend through and beyond the rear face 127 of housing section 118 when the contacts are fully inserted in the housing. These contact fingers are surrounded by insulating silos 131 molded onto the rear face 127 of the housing. The structure of each of the silos 131, and similar insulating silos of other plug-in components of the system, is identical and comprises two opposed shells 131a, 131b spaced apart to provide a groove 130 of sufficient width to clear the thickness of a bus bar of a power block 10 or 10'. The walls of shells 131a, 131b are relatively thin and are convoluted to provide interior channels into which the fingers 110–113 extend with sufficient clearance to permit deflection of the fingers upon engagement with a bus bar. The exterior walls of such channels covering fingers 110–113 are seen, respectively, at 110b, 111a, 112b and 113a. The ends of such channels are covered by overturned lips 132 which extend to the edge of groove 130. The contact fingers are accessible only through groove 130 which is too narrow to permit entry by a one-quarter inch probe in accordance with U.L. requirements or by a human finger and thus the contact fingers are at all times protected against contact by a human hand.

The outlines of each of the various openings in the faces of the power block into which the silos 131 etc. are complimentary to the outlines of the periphery of the silos. The openings are so dimensioned that the silos will pass therethrough with close clearances and the silos are so dimensioned as not to require any gaps in the power block housing openings of such width as to permit entry, from any angle, of a quarter-inch diameter blunt-ended test probe to a depth permitting any part of the probe end to contact the underlying bus bar. Therefore, the bus bars are also protected at all times against contact by a human finger, whether during installation or removal of a plug-in component or when no plug-in component is installed in the power block. Further details of the safety features are disclosed in co-pending application Ser. No. 07/394,602, filed Aug. 16, 1989, entitled "LOW PROFILE SPRING CONTACT WITH PROTECTIVE GUARD MEANS", now U.S. Pat. No. 5,024,610, owned by the assignees of the present invention and incorporated by reference herein.

Referring to FIG. 8, the end of connector 25 is fitted with a latch plate 133 attached to the connector by a flexible tongue (not seen) to enable fore and aft toggling of the latch plate. The edge of plate 133 adjacent the rear face of housing 118 is finished with a bevelled lip 134 which overrides ramp 106 (FIG. 5) of mounting post 101 on the power block housing and engages the lower edge of the ramp to lock the connector 25 in place upon insertion into a power block. The connector may be unlocked for removal from the power block by moving the outer edge of plate 133 forward to disengage lip 134 from the lower edge of ramp 106 and permit withdrawal of the connector from the power block.

Removal of a connector 25 from a power block is aided by a bail 135 the ends of which are bent back into parallel arms 136, 136' with loops formed at the ends. The bail arms 136, 136' fit into grooves 137, 137' in housing 118 and are pivotally retained therein by pins (not shown) passed through the arm loops. Slits 138, 138' in cover plate 119 coinciding with grooves 137, 137' permit fore an aft pivotal motion of bail arms 136, 136' when the cover plate is secured to the housing 118. Grooves 137, 137' open through the end of housing 118 so that when the connector is installed in a power block bail 135 may be folded flat against the housing with the middle portion of the bail extending over the outer surface of latch plate 133. In this position of the bail, latch plate 133 cannot be pivoted forward to disengage lip 134 from the lower edge of ramp 106. For removal of the connector from a power block, bail 135 is swung outward from the connector housing, permitting latch plate 133 to be toggled forward to release engagement with ramp 106 and providing a convenient handle for withdrawal of the connector from the power block. Further details of the latching and locking features are disclosed in co-pending application Ser. No. 07/394,591, filed Aug. 16, 1989, entitled "LATCH AND LOCKING HANDLE FOR AN ELECTRICAL CONNECTOR", owned by the assignee of the present invention and incorporated by reference herein.

Details of the construction of the base power-in connector 42 will be described with reference to FIGS. 3, 4, 4A, 4D and 9-11A. As shown in FIGS. 3 and 4, the upper left-hand quadrant of the mid-portion of the face of the housing of power block 10 is pierced by four openings 31-34 arranged in two vertical columns of two openings each. Four openings 35-38 arranged in two vertical columns of two openings each are positioned in the lower right-hand quadrant of the power block housing in symmetry with the openings 31-34. Openings 31-34 are respectively aligned with bus bars 11-14 and openings 35-38 are respectively aligned with bus bars 17-20 and allow access to those bus bars by male contacts of a plug-in duplex outlet unit or a base power-in connector by which power from the base power distribution system is supplied to the panel power distribution system. Additional openings 39, 40, respectively aligned with bus bars 15, 16 to allow access to those bus bars by male contacts of a base power-in connector. It is to be noted that while only one base power-in connector 42 is required for a modular wall system, the power distribution system can readily accommodate interconnection with the power source in an of the furniture units adapted to receive a receptacle outlet, as described herein.

The base power-in connector 42, shown schematically in FIGS. 4A and 4D, is illustrated in detail in FIGS. 9-11A. FIG. 9 is an isometric drawing of the power-in connector 42 as seen from the front. The housing of connector 42 comprises a base section 140 of insulating material and a metal front cover section 141. The power-in connector includes ten insulated wires by which a set 43 (FIG. 4A) of ten male contacts, having essentially the same configuration as contacts 26 previously described with reference to FIG. 7, are connected to the base system. Each contact set is surrounded by one of ten insulating silo 31'-40' which are molded into the back face of the connector housing in a pattern that is congruent with the layout pattern of the openings 31-40. Each of the silos 31'-40' is dimensioned to fit with minimum clearance within one of the openings 31-40. For purposes of illustrating the invention, the contacts and their respective silos are arranged in the following order.

| Silo | Base System Conductor |
|------|----------------------|
| 31'  | Line 4 (L4)          |
| 32'  | Neutral 4 (N4)       |
| 33'  | Line 2 (L2)          |
| 34'  | Neutral 2 (N2)       |
| 39'  | Safety Ground (SG)   |
| 40'  | Isolated Ground (IG) |
| 35'  | Neutral 1 (N1)       |
| 36'  | Line 1 (L1)          |
| 37'  | Neutral 3 (N3)       |
| 38'  | Line 3 L3)           |

When the power-in connector 42 is plugged into the face of power block 10, bus bars 11-20 become connected to the base power system in the same order as are the male contacts of connector 42. The wires connecting the set 43 of male contacts (not shown) of connector 42 to the base power distribution system pass through an opening in the face of cover 141 and are protected beyond the connector by metal conduit 142.

FIG. 10 is an isometric view of the rear face of the base section 140 of the housing of connector 42. The pattern of the arrangement of the insulating silos 31'-40' for the male contacts of connector 42 is clearly illustrated in FIG. 10. Because of the symmetry of the pattern in which silo 31'-40' are arranged, these silos could be fit into openings 31-40 or 31b-40b of the power block housing sections 71 or 72 (see FIG. 5), which is proper; or the connector could be turned end to end and silos 31'-40' could fit into openings 31-40 in reverse order, which is improper. Incorrect installation of connector 42 in a power block is prevented by shaping the recesses 143 and 143' at the opposite ends of base 140 with outlines which are complementary to the outlines of mounting posts 101 and 102, respectively, thus polarizing the connector. A slit 144 extends through the wall to the interior of base 140 along the center line of base 140 in each of the recesses 143, 143' to accommodate tangs 58, 59 on the SG bus bar 15. Also seen in FIGS. 9 and 10 is a hole 145 through which a fastener is passed to secure connector 42 to mounting post 102. A similar hole is provided in recess 143.

Figure 11:
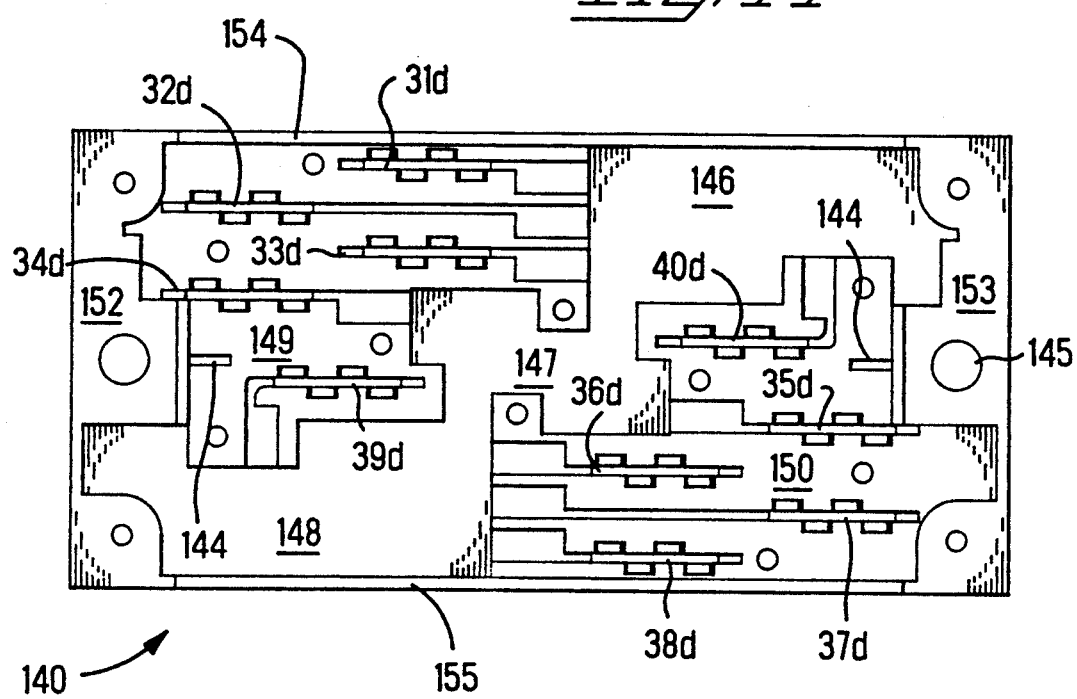
FIG. 11 is an elevational front view of the housing shown in FIG. 10.
Figure 11A:
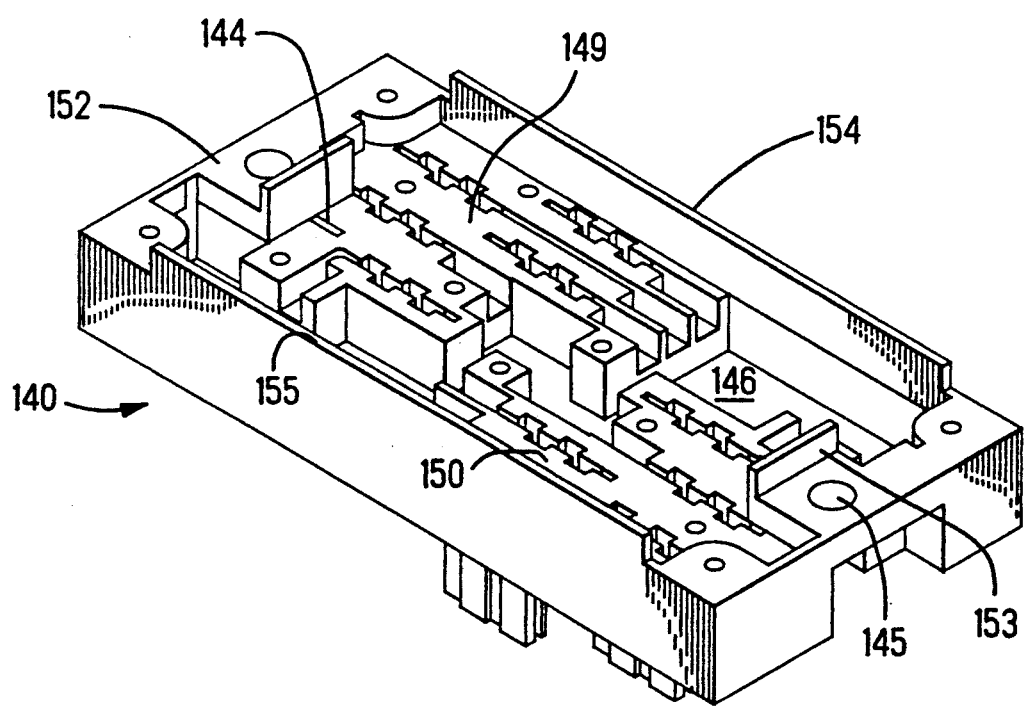
FIG. 11A is an isometric drawing of a front view of the housing shown in FIG. 10.

FIG. 11 is a front elevation of the base 140 of connector 42 and FIG. 11A is a front isometric view thereof, both showing the interior construction of the base. Base 140 may be considered to be formed in four levels of thickness. The lowest thickness level, or the areas in which the base is thinnest, are the floors of cavities 146, 147, 148. The second thickness level may be considered to be the top plane of two diagonally opposite mesas 149 or 150 into which the various slits for receiving the male contacts of connector 42 are formed. The vertical edges of mesas 149, 150 define the walls of cavities 146-148. The third thickness level may be considered to be the top plane of the end areas 152, 153 and the fourth thickness level may be considered to be the plane of the top edges of the side walls 154, 155 of base 140. These several levels of thickness of base 140 ensure that space is available within the connector for the installation of ten sets of male contacts and their connecting wires.

Slits $31d$-$34d$, $39d$ extend through mesa 149 and open to the rear face of base 140 at the locations thereon of silos 31'-34', 39', respectively. Slits $35d$-$38d$, $40d$ extend through mesa 150 and open to the rear face of base 140 at the locations of silo 35'-38', 40', respectively. Slits 31d-40d and the male contacts which fit therein have an essentially identical configuration as the slits 122 and contacts 26 described with reference to FIG. 7.

Figure 13:
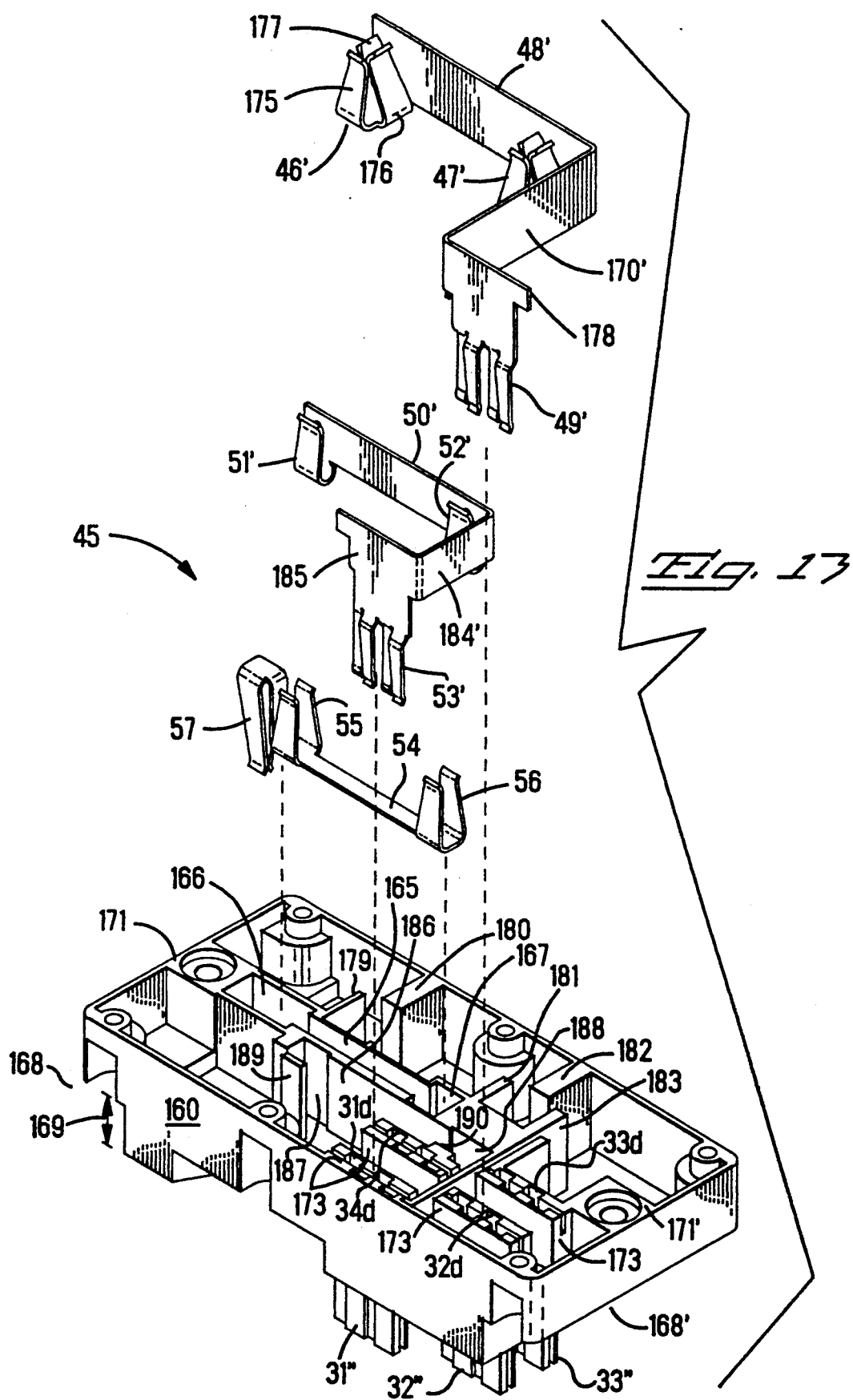
FIG. 13 is a drawing similar to FIG. 12 except that the contacts shown in FIG. 13 are fashioned differently from those of FIG. 12 to form the second type of outlet unit used in the invention.
Figure 14:
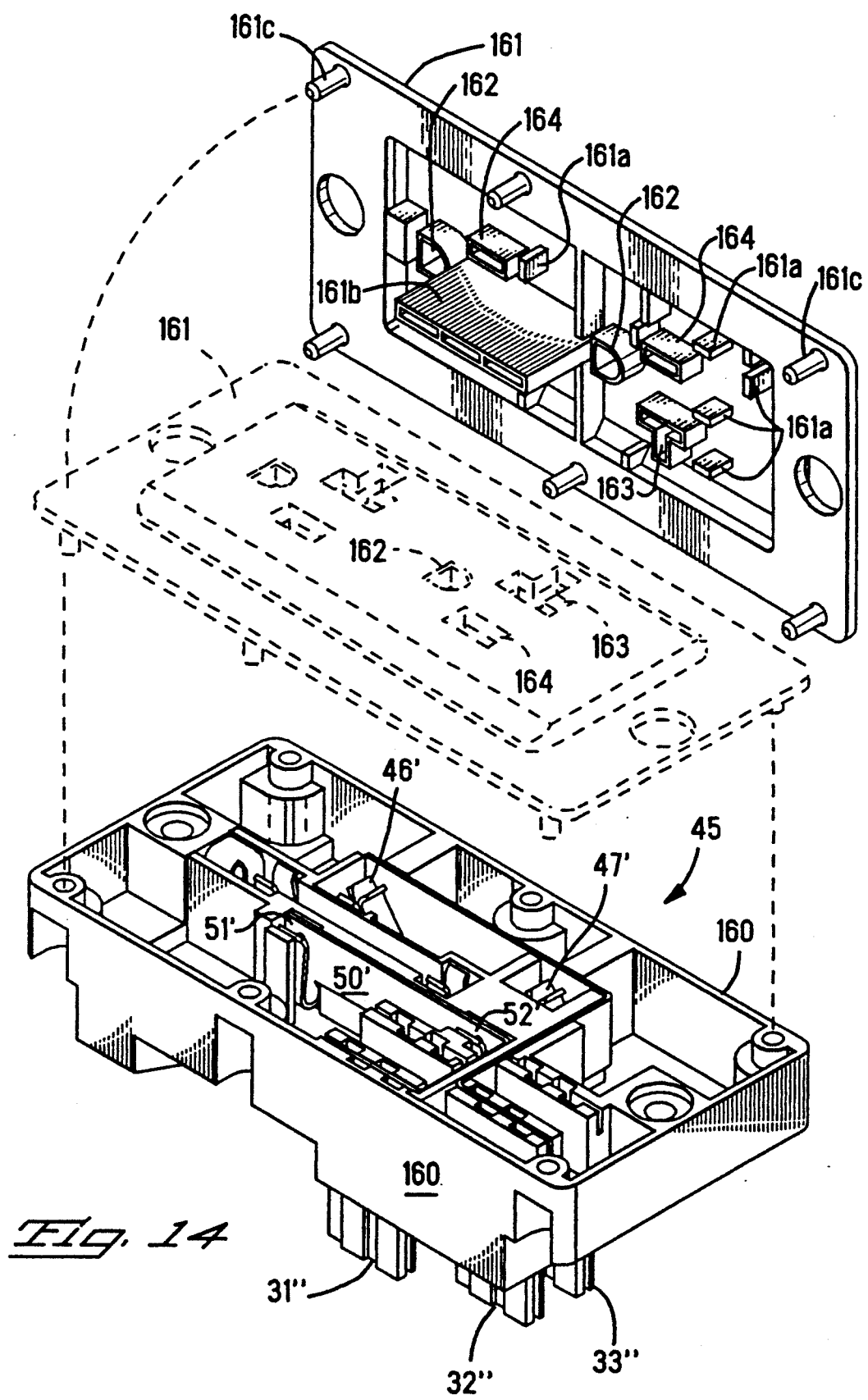
FIG. 14 is an isometric drawing of one of the two types of duplex outlet units used in the invention with the front cover removed.

Assuming that circuit continuity with the bas power system is established in the power block either by a jumper cable connected through connector 25 to the energized power distribution system of an adjoining panel unit or by a power-in connector 42 connected to the power block 10', power block 10 is capable of accepting, on both faces, one of either of two types of plug-in outlet units 44 or 45, shown schematically in FIGS. 4B and 4C and in detail in FIGS. 12-14.

Outlet unit 44, hereinafter sometimes referred to as a type "A" outlet unit, is shown schematically in FIGS. 4B and 4D and in detail in FIG. 12. As described herein, outlet unit 44 is configured to provide electrical interconnection to either the L1, N1 conductors in a first orientation or to the L2, N2 conductors in a second orientation. Unit 44 includes male contacts 49, 53 which are substantially identical to the male contact sets of connectors 25, 42. Contacts 49, 53 are surrounded by silo 33", 34" (FIG. 2) in the same manner as previously described with respect to connectors 25, 42. Silo 33", 34" extend from a location on the back of the outlet housing that coincides in one orientation, with openings 36, 35 in the face of power block 10. When the outlet unit 44 is turned end to end, or "flipped", silos 33", 34" coincide, respectively, with openings 33, 34 of the power block housing. Thus, when outlet unit 44 is installed in power block 10 in the first orientation, contacts 49, 53 engage bus bars 17, 18 respectively thus connecting outlet contacts 46, 47 to the N1 conductor of the system and outlet contacts 51, 52 to the L1 conductor of the system. Installed in the second orientation, contacts 49, 53 engage bus bars 13, 14 respectively connecting contacts 46, 47 to the N2 conductor of the system and contacts 51, 52 to the L2 conductor of the system.

Outlet unit 45, sometimes referred to hereinafter as a type "B" outlet unit, and shown schematically in FIGS. 4C and 4D and in detail in FIGS. 13 and 14, is substantially similar to outlet unit 44, except that the male contacts 49', 53' thereof, corresponding to contacts 49, 53 of outlet unit 44, are contained within insulating silo 32", 31" which extend from the back of the housing of unit 45 from positions that coincide with openings 38, 37 in one orientation of unit 45. Turned end to end or "flipped" to a second orientation, the positions of silo 31", 32" coincide, respectively, with openings 32, 31 of power block 10. Thus, when outlet unit 45 is installed in power block 10 in the first orientation, contacts 49', 53' engage bus bars 19, 20, respectively connecting outlet contacts 46', 47' to the N3 conductor of the system and outlet contacts 51', 52' to the L3 conductor, respectively. When outlet unit 49 is installed in the power block 10 in the second orientation, contacts 49', 53' engage bus bars 12, 11, respectively thus connecting contacts 46', 47' to the N4 conductor of the system and contacts 51', 52' to the L4 conductor of the system.

Outlet units 44 and 45 contain identical ground contacts 57 contained in the outlet unit housing along the longitudinal center line of the housing for engaging system ground. An opening in the back face of the outlet unit housing positioned in alignment with contact 57 permits access thereto by one of two tangs 58 or 59 which are formed on bus bar 15 to project forward from the face of the housing of power block 10. When either of the A or B types of outlet units is installed in the power block in a first orientation, tang 58, (or 58') engages contact 57 to connect contacts 55, 56 to the safety ground conductor of the system, as shown on the right-hand sides of FIGS. 17, 18, respectively. When either of the outlet unit types is installed in the power block in the second orientation, tang 59, (or 59') engages contact 57 to connect contacts 55, 56 to the safety ground conductor of the system, as shown on the left-hand sides of FIGS. 17 and 18, respectively. Because the common safety ground conductor tangs 58, 59, 58', 59' are at the vertical center of power block 10, 10', as described above, and contact 57 is in the vertical center of the outlet housing base 160, contact 57 connects with one of the ground tangs 58, 59, 58', 59' to provide the power outlet safety ground regardless of which of the bus bars 11-14 and 17-20 (P1-P4, N1-N4) are connected as the power and neutral supply circuit for the outlet. The power block and the duplex power outlet unit are thus compact permitting the eight bus bars which comprise the four power supply circuits to fit within a powerway originally designed for three-wire circuits. This allows retrofitting of power blocks 10, 10' and the duplex power outlets 44, 45 within panels having wiring channels with limited height. Accordingly, the flexibility and utility of a ten-wire system may be provided in existing furniture units having a more limited number of power supply conductors therein without replacing the older furniture units.

FIGS. 12-14 illustrate further details of the two types of outlet units 44 and 45 used in the system. For purposes of illustrations outlet units 44, 45 are shown as duplex receptacles It is to be understood that the receptacles may also be simplex, triplex, etc. Both types of outlet units 44, 45 use identical housings comprising a base section 160 and a cover 161 molded from insulating material. FIG. 14 is an isometric drawing of a type B connector 45 with the cover 160 removed and rotated to show the underside thereof all four of the insulating silos, 31", 32" of unit 45 and 33" and 34" of unit 44, are molded onto the rear face of base 160 in one quadrant thereof. Only silos 31", 32", 33" can be seen in FIGS. 12-14. The cover 161 contains two identical sets of openings each of which sets includes a D-shaped opening 162, a T-shaped opening 163 and a rectangular opening 164 for accepting any of the common plug types, such as a two-prong, non-polarized plug; a two-prong, polarized plug or a three-prong grounded plug. The underside of cover 161 includes a plurality of pedestals 161a, 161b that extend into housing 160 and are configured to provide means for retaining respective contact members in housing 160 and in electrical engagement with the selected bus bar members as plugs (not shown) are inserted and/or removed from the duplex receptacle. Cover 161 further includes staking posts 161c for securing cover 161 to base section 160. FIGS. 15-19 show respective pedestals 161b in position against respective ground contact members 54 and FIG. 20 shows a plurality of pedestals 161a.

A channel 165, having end portions 166, 167 of enlarged width, extends along the longitudinal center line of base 160. Ground contacts 55-57, formed as an integral piece 54, fit into channel 165 with contacts 55, 57 occupying channel portion 166 and contact 56 occupying channel portion 167. Contacts 55-57 are of U-shaped configuration with contacts 55, 56 open to the face of the outlet unit in alignment with the openings 162 in the cover 161. Both ends of base 160 are stepped inward across the width of the base to create end ledges 168, 168' having a height 169 equal to the height of mounting posts 101 and 102 (FIG. 5) on the power block faces. The interior of base 160 is thickened at the opposite ends along the center line of the base to provide strengthened mounting blocks 171, 171' having recessed holes therein through which fasteners are passed into posts 101, 102 to secure the outlet unit in place in a power block. The wall of mounting block 171' forming the end wall of channel portion 166 is slotted along the center line to allow entry of one of the ground tangs 58 or 59 into portion 166 when the outlet unit is installed in a power block. The downward facing ground contact 57 of the outlet unit then engages the portion of tang 58 or 59 protruding into channel portion 166.

Four generally rectangular-shaped piers 173 extend upward from the floor of base 160, each in alignment with one of the silos 31"-34" projecting from the rear face of base 160. Slots 31d-34d, identical in form to the slots described with reference to FIG. 7, extend through the piers 173, respectively aligned with silos 31"-34" and open to the rear face of base 160 within the enclosures formed by silos 31"-34".

Referring to FIG. 12, contacts 46, 47, 49 are formed as a unitary piece from strip 48. Contacts 46, 47 are each comprised of three leaves 175-177 bent upward from the lower edges of strip 48 to converge at the outer ends thereof. Contacts 46, 47 engage one of the prongs of a non-polarized plug between the under surface of leaf 175 and the outer edges of leaves 176, 177. The prong of a polarized plug for connecting to a neutral line is engaged between the facing surfaces of leaves 176, 177. The end of strip 48 extending beyond contact 47 is bent into an L-shape having a leg 170 extending transversely to the axis of contacts 46, 47 and a leg 178 extending outward in a direction parallel to the axis of contacts 46, 47. Contact 49 for engaging the N1 or N2 bus bar, 19 or 12, of the power block is formed along and faces downward from the lower edge of leg 178. The contacts 46-49 fit into base 160 with contacts 46, 47 in alignment with the T-slots of cover 161. The portion of strip 48 connecting contacts 46, 47 extends between the facing edges of partitions 179-183. The leg 170 runs along the wall of partition 183 and the leg 178 enters slot 34d along the edge thereof facing partition 183.

Contacts 51-53 are formed as a unitary piece from strip 50. Contacts 51, 52 are each formed of a single leaf bent upward from the lower edge of strip 50 in facing relationship to strip 50. The portion of strip 50 extending beyond contact 52 is bent perpendicularly to the axis of contacts 51, 52 to form a leg 184 extending transversely to the axis of contacts 51, 52 and the end portion of leg 184 is bent back perpendicularly along a line parallel to the axis of contacts 51, 52 to form an end leg 185. Contact 53 for engaging L1 or L2 bus bars 17 or 13, projects downward from the low edge of leg 185.

Contacts 51-53 fit into base 160 with the open ends of contacts 51, 52 facing upward in alignment with slots 164 of cover 161. The portion of strip 50 connecting contacts 51, 52 extends along the face of wall 186 forming one side of channel 165. Contacts 51, 52 are respectively fit into niches 187, 188 in wall 186 and are held in position therein by a post 189, which extends upward from the floor of base 160 opposite niche 187 and from a ridge formed on the face of the pier 173 opposite niche 188. Arm 184 extends along the internally facing wall of partition 183 and arm 185 enters 34d along the edge thereof adjacent the inwardly facing wall of partition 183.

Referring to FIG. 13, the assemblies of contacts 46', 47', 49', 51', 52' in outlet unit 45 are of substantially the same form as the assemblies of contacts 46, 47, 49, 51, 52 in outlet unit 44, except that the arms 170', 184' shown in FIG. 13 are longer than the corresponding arms 170, 184 shown in FIG. 12. When the assembly of contacts 46', 47', 49' is installed in base 160 the disposition of contacts 46', 47' in the base will be the same as the disposition of contacts 46, 47 described with reference to FIG. 12. Because of the longer length of arm 170', however, contact 49' will be disposed in slot 32d, entering the slot from the end thereof adjacent the facing wall of partition 183 and will engage either the N3 or N4 bus bars 19 or 12. Similarly, when the assembly of contacts 51'-53' is installed in base 160, the disposition of contacts 51', 52' therein will be the same as the disposition of contacts 51 and 52 described with reference to FIG. 12. Again, because of the longer length of arm 184', contact 53' will be disposed in slot 31d, entering slot 34d through the end thereof adjacent the internally facing wall of partition 183 and will engage either the L3 or L4 bus bars, 20 or 11. Contact assemblies 46', 47', 51', 52', are shown installed in base 160 in FIG. 14. Since the contacts of outlets 44, 45 are used in an identical base 160 with identical covers 161, an installer need only carry, and retailer need only inventory, a single type of outlet base, a single type of cover and the two different types of contacts for the type A and type B outlets. To connect with the four different power supply circuits in the power block, contacts 49, 53 or 49', 53' are installed in the power outlet base and the power outlets are assembled at the appropriate orientation. Alternatively, the installer can carry the two types of power outlets 44, 45 with the contacts already installed therein In either case, the number of parts which an installer must carry to provide four different power outlet connections is minimized. Further details of the outlet units are disclosed in co-pending application Ser. No. 07/394,781 filed Aug. 16, 1989, entitled "PLUG-IN OUTLET UNIT FOR MODULAR FURNITURE POWER DISTRIBUTION SYSTEM," now U.S. Pat. No. 4,952,164 owned by the assignees of the present invention and incorporated by reference herein.

Figure 15:
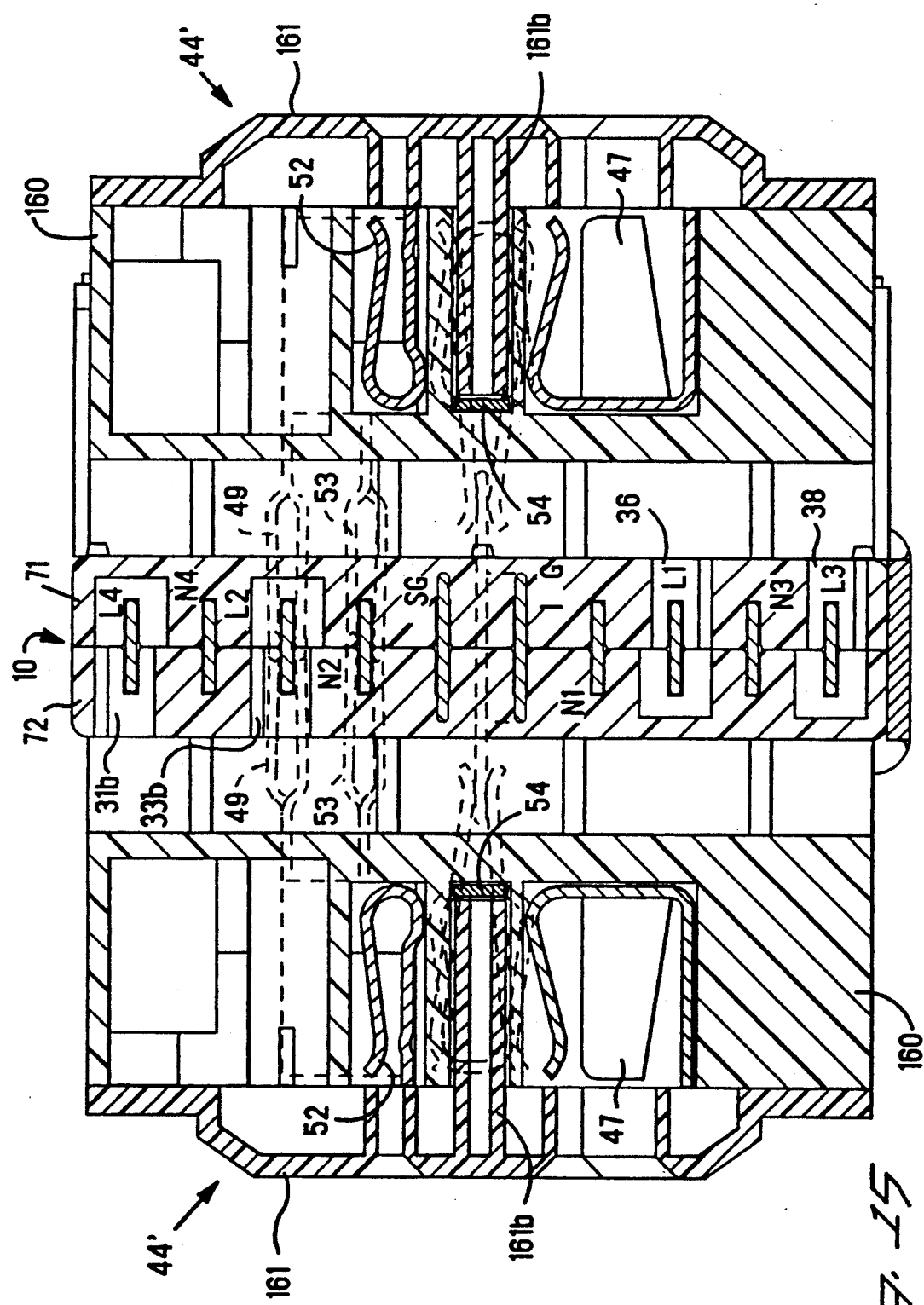
FIG. 15 is a vertical section through a power block having a duplex outlet unit of the type shown in FIG. 14 installed in the opposite faces of the power block with both outlet units being oriented to the same hand.

FIG. 15 is a vertical section through a power block 10 showing an outlet unit 44', of the type shown in FIG. 12, installed in the opposite faces of the power block. The outlet units 44, 44' are both installed with the contacts 49, 53 oriented to the right, when the rear face of unit 44 is viewed. Contacts 53, 49 of the outlet unit shown to the right, respectively enter openings 33, 34 of power block housing section 71 (FIG. 5) to engage L2, N2 bus bars, 13, 14. Contacts 53, 49 of the outlet unit shown to the left, respectively enter openings 33b, 34b of housing section 72 and also engage bus bars 13, 14. Thus contacts 52 of both outlet units are connected to the L2 conductor of the system and contacts 47 of both outlet units are connected to the N2 conductor of the system.

Figure 16:
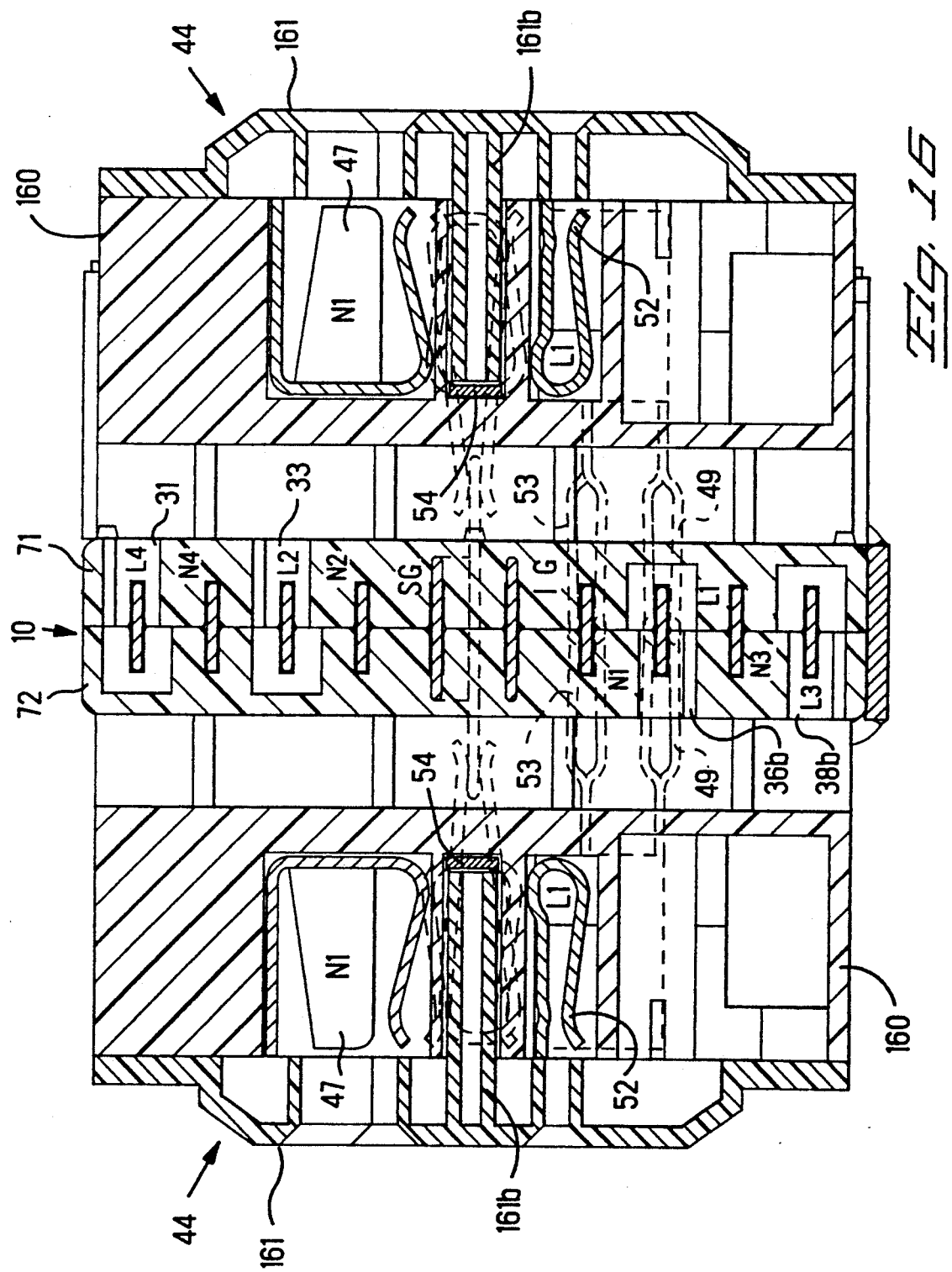
FIG. 16 is a section similar to FIG. 15, except that both outlet units are installed in the power block oriented to the opposite hand from those of FIG. 15.

FIG. 16 shows the outlet units 44, 44' installed in the power block with contacts 49, 53 of both units oriented to the left, when the rear face of outlet unit 44 is viewed. Contacts 53, 49 of the outlet unit 44 shown to the right, respectively enter openings 35, 36 of power block housing section 71 (FIG. 5) and engage bus bars 17, 18. Contacts 53, 49 of the outlet unit 44 shown to the right, respectively enter openings 35b, 36b of power block housing section 72 and also engage bus bars 17, 18. Thus, contacts 52 of both outlet units are connected to the L1 conductor of the system and contacts 47 of both outlet units are connected to the N1 conductor of the system.

Figure 17:
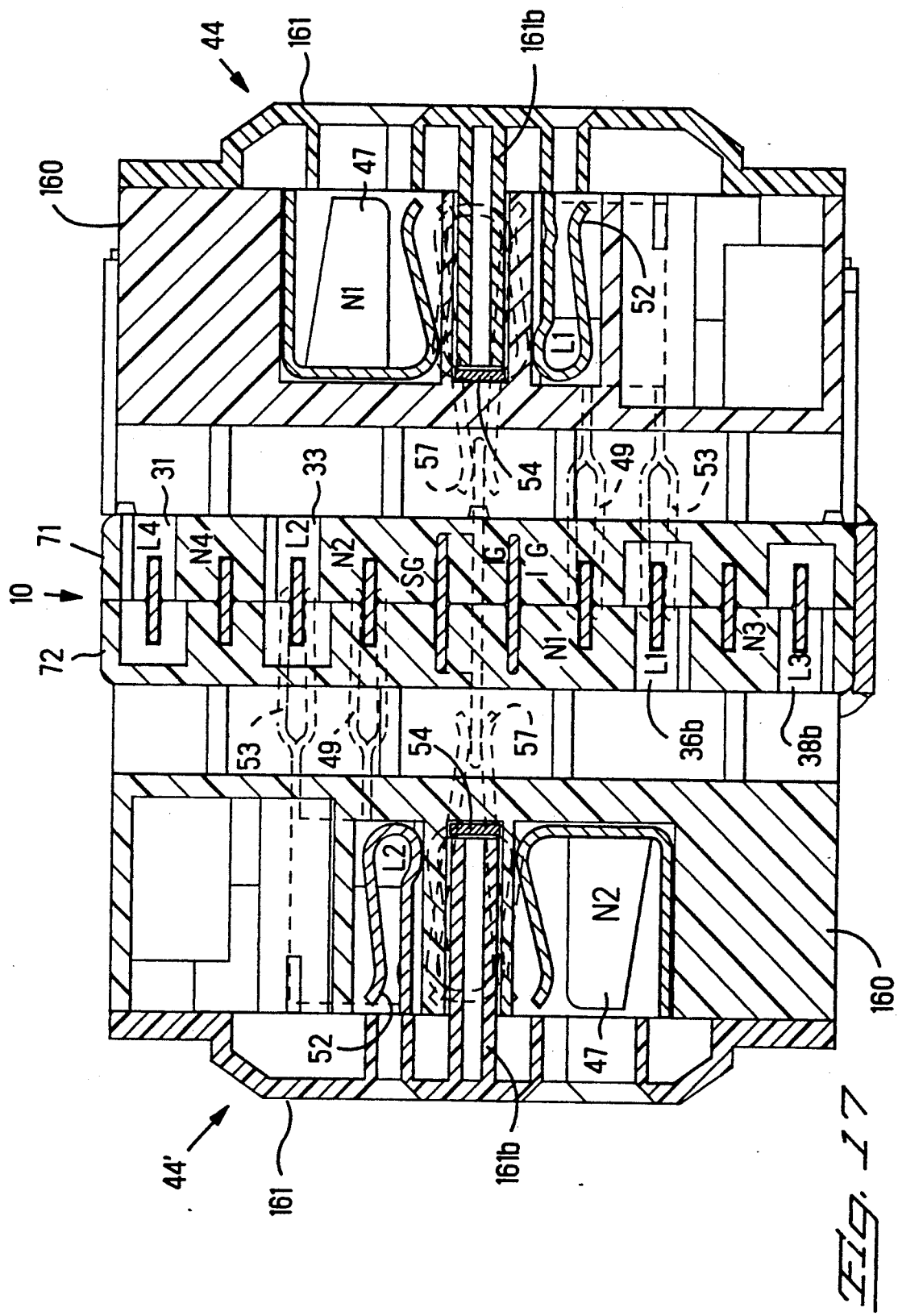
FIG. 17 is a section similar to FIG. 15 or FIG. 16, except the outlet units installed in the opposite faces of the power block are oriented to the opposite hands.

FIG. 17 is a vertical section through a power block 10 having an outlet unit 44, of the type shown in FIG. 12, installed in power block housing section 71 with the same orientation of unit 44 as is shown in FIG. 16. Contacts 52, 47 of unit 44 are thus respectively connected to the L1, N1 conductors of the system. FIG. 17 further includes an outlet unit 44' of the type shown in FIG. 12, installed in power block housing 72 with the same orientation as is shown in FIG. 15. Contacts 52, 47 of unit 44' are thus respectively connected to the L2, N2 conductors of the system.

Figure 18:
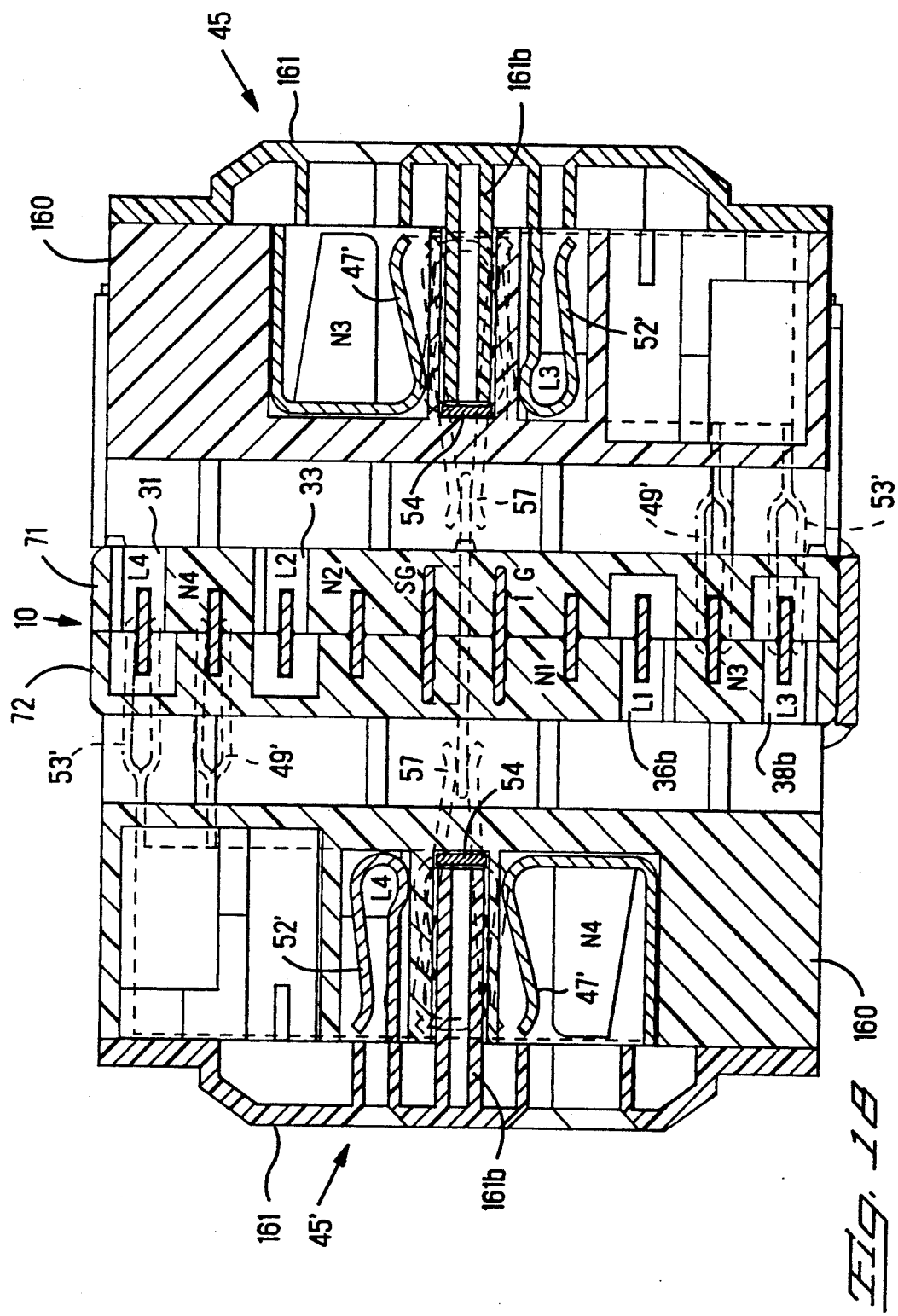
FIG. 18 is a vertical section through a power block having an outlet unit of the type shown in FIG. 13 installed in the opposite faces of the power block with both outlet units being oriented to the same hand.

FIG. 18 is a vertical section through a power block 10 having duplex outlet units 45, 45' of the type shown in FIG. 13, installed in the opposite faces of the power block. The outlet unit 45 shown to the right was installed with contacts 49', 53' thereof positioned to the left, when the rear face of unit 45 is viewed. Contacts 49', 53', respectively enter openings 37, 38 of power block housing section 71 (FIG. 5) to engage bus bars 19, 20 thereby respectively connecting contacts 52', 57' of the right hand unit 45 to the L3 and N3 conductors of the system.

Outlet unit 45', shown to the left in FIG. 18, was installed with contacts 49', 53' thereof positioned to the right, when the rear face of unit 45 is viewed. Contacts 53', 49' respectively enter openings 31b, 32b in power block housing section 72 to engage bus bars 11, 12 thereby respectively connecting contacts 52', 47' of the left-hand unit 45' to the L4, N4 conductors of the system.

Figure 19:
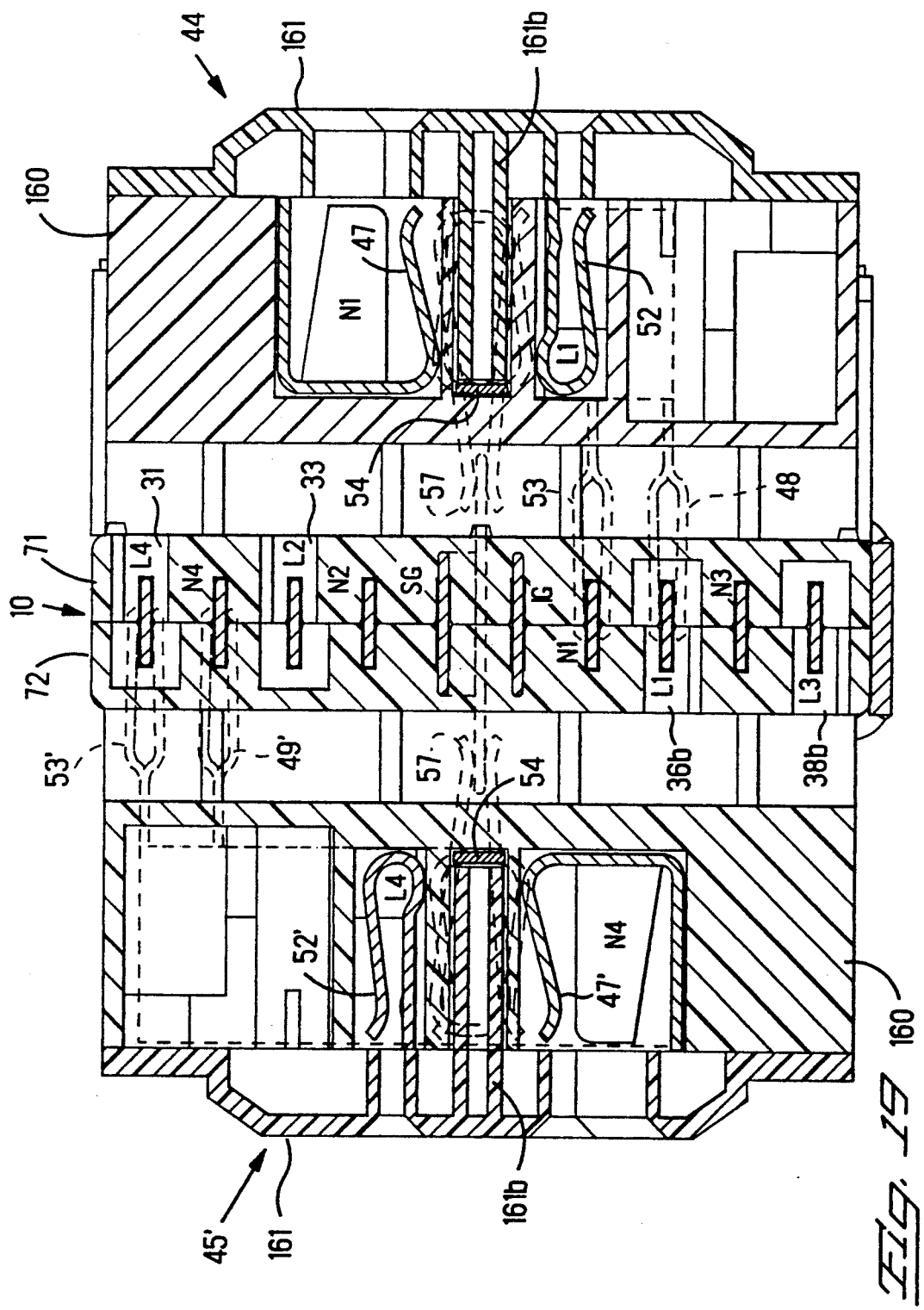
FIG. 19 is a vertical section through a power block having an outlet unit of the type shown in FIG. 14 installed in the right-hand face of the power block and an outlet unit of the type shown in FIG. 13 installed in the left-hand face of the power block.
Figure 71:
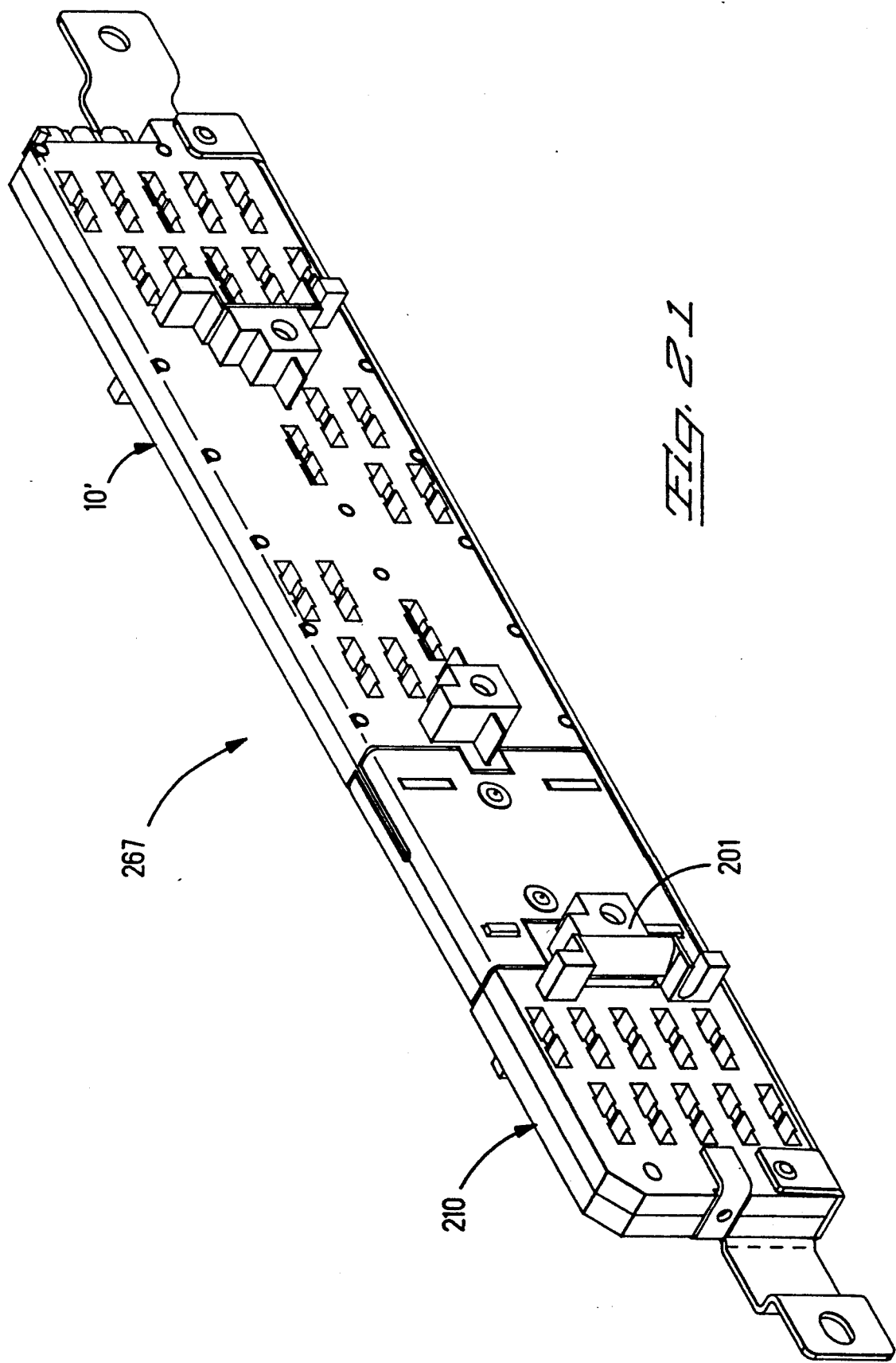

FIG. 19 is a vertical section through a power block 10 having an outlet unit 44, of the type shown in FIG. 12, installed in power block housing section 71 with the same orientation of unit 44 as is shown in FIG. 16. Contacts 52, 47 of unit 44 are thus respectively connected to the L1, N1 conductors of the system.

In FIG. 19, an outlet unit 45' is installed in power block housing section 72 with the same orientation as the unit 45' shown to the left in FIG. 18, thereby respectively connecting contacts 52' and 47' of unit 45 to the L4, N4 conductors of the system.

FIG. 20 is a longitudinal section through a power block 10 having outlet units of the type shown in FIG. 12 installed in the opposite faces of the power block with the same orientation as is shown in FIG. 15. A jumper cable connector 25 is shown installed in housing section 71 of the power block. The longitudinal spacing between the contacts 53 of the respective outlet units 44', which is not evident in FIG. 15, is clearly seen in FIG. 20. Contacts 49 of the respective outlet units 44 are similarly longitudinally spaced, but these contacts are not seen in FIG. 20.

Figure 8B:
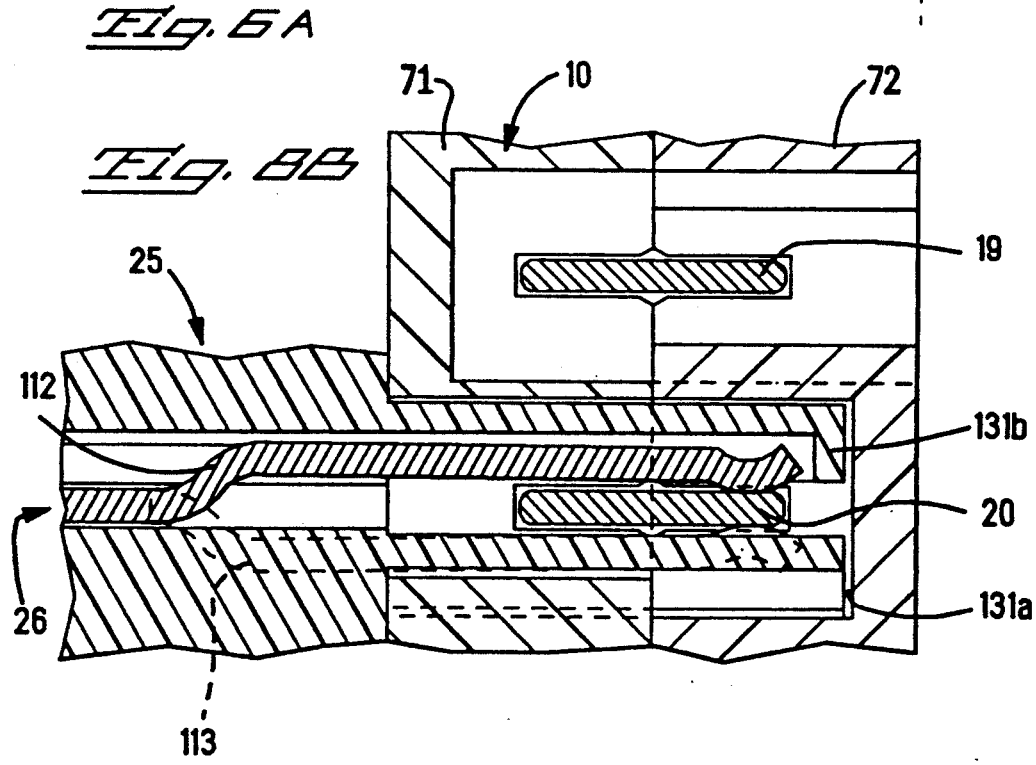
FIG. 8B is an exploded, fragmentary, cross-sectional view of one jumper cable connector of FIG. 8A mounted to a power block.
Figure 8:
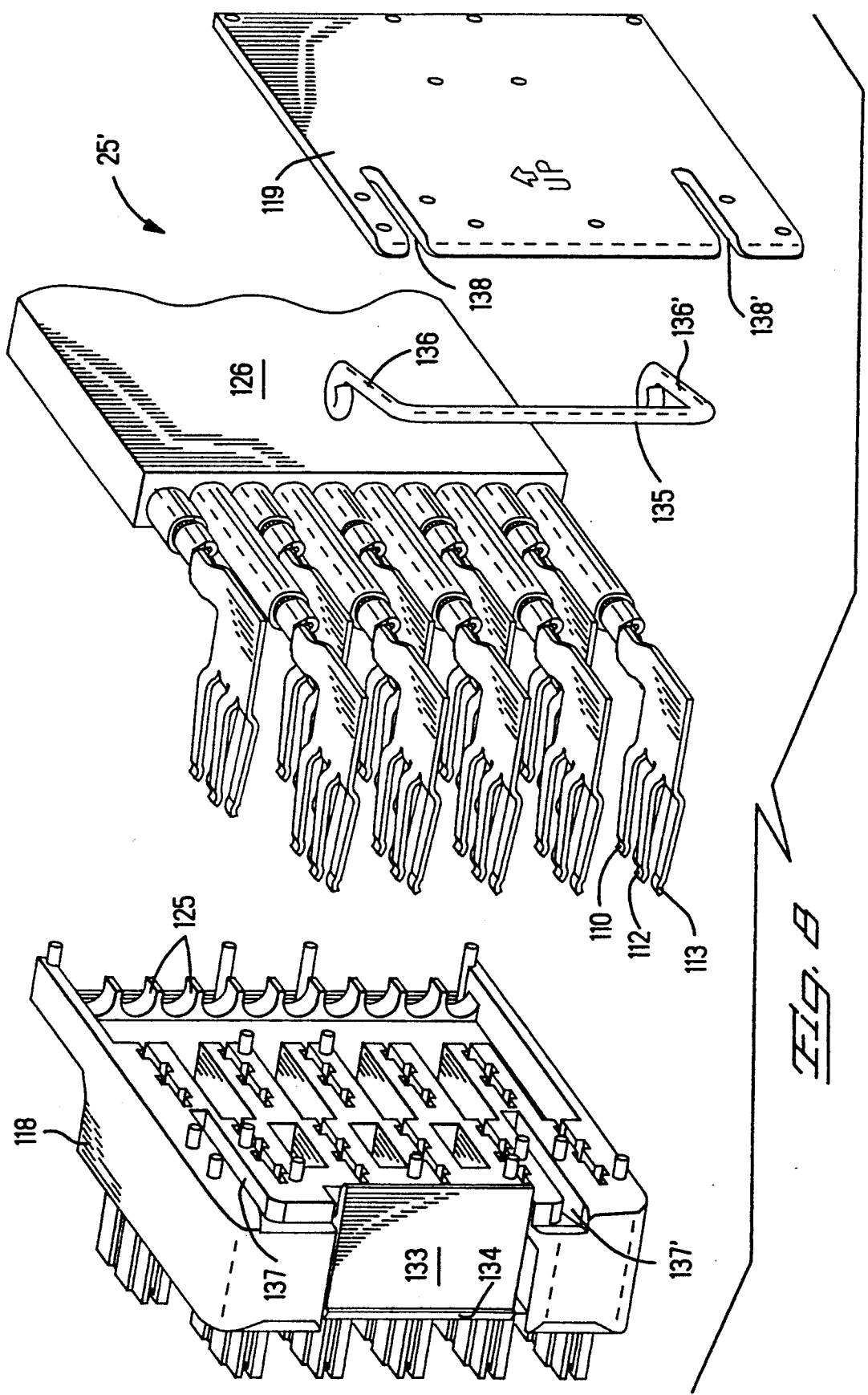
FIG. 8 is an isometric drawing of an exploded view of a jumper cable connector showing the placement therein of the contacts and wires of a ten-wire jumper cable.
Figure 8A:
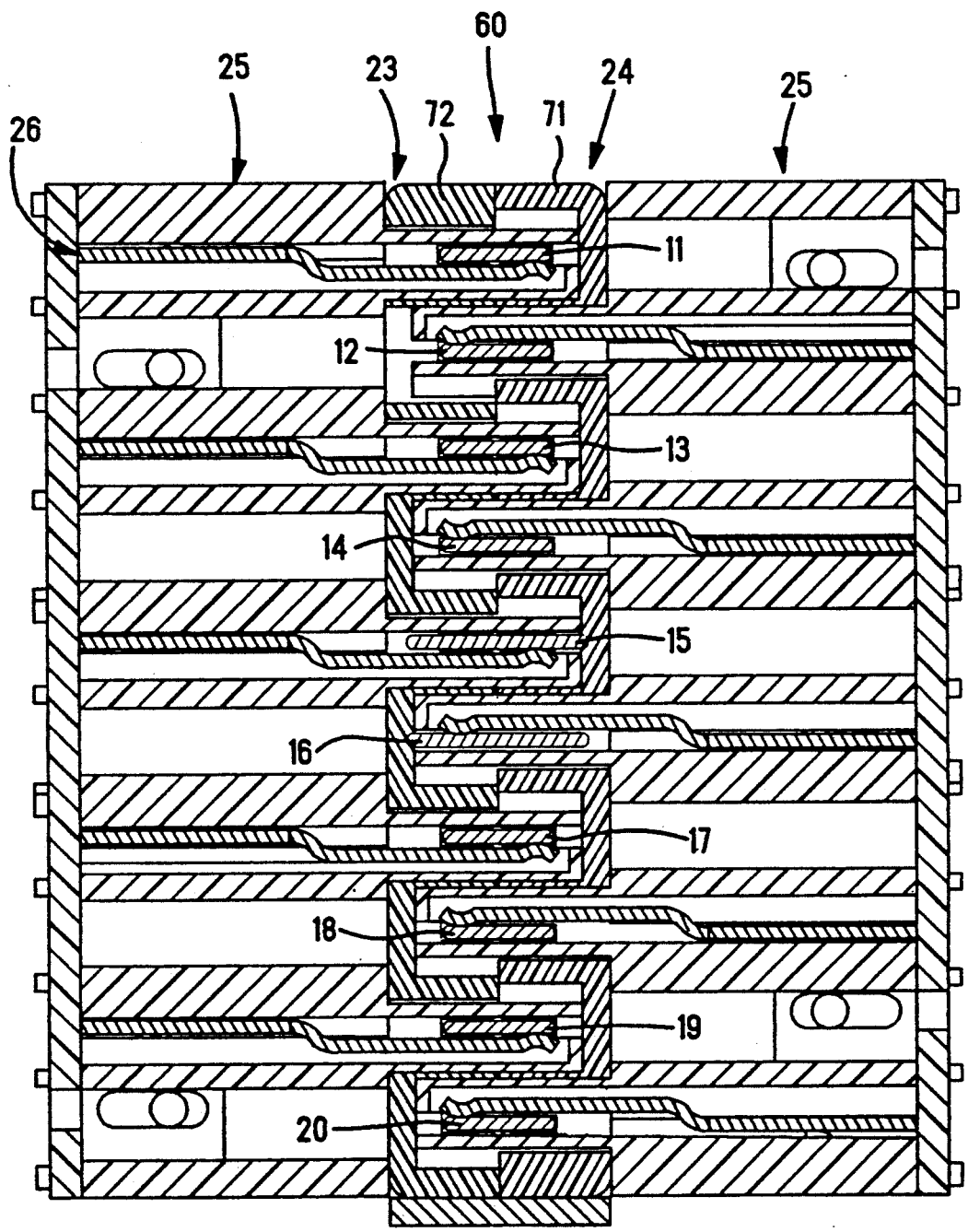
FIG. 8A is a cross-sectional view of two jumper cable connectors mounted to the power block.

As best illustrated in FIGS. 5, 6A, 8A, 8B and 15–20, access openings 23, 24, 31, 32, 34–37, 38 and 39 extend through housing half 71 into housing half 72 and end at a position adjacent the face of housing half 72. The openings in housing half 72 extend through housing half 72 into housing 71 and end at a position adjacent the face of housing half 71. Accordingly, the openings in the housing halves extend beyond the bus bars 11–20 as best illustrated in FIGS. 8A and 8B. The contacts of plug-in units such as 25, 42, 44, 45 will thus extend over the width of bus bars 11–20 to make a durable, secure, wiping connection with the bus bars. Additionally, the depth of the openings is such that they accommodate the contact silos 131 which extend most of the width of housing 10 to provide stable, rigid support of the plug-in components on the power block. Because the openings on the front and back faces are not aligned, the housing accommodates the silos and contacts of the plug-in units within a housing having a thickness which is approximately equal to the length of the silos.

The power distribution system 67 of the invention installed within the bottom edge of a typical modular wall panel unit 62, as shown in FIG. 1. At the bottom edge of panel unit 62, top and bottom longitudinal rails 63, 64 are secured in spaced relationship by vertical brackets 65, 65' defining an open faced channel running the length of the panel unit. Adjustable foot pads 66, 66' extend downward from bottom rail 64 near the opposite ends of the panel unit to support the panel against the floor. The power distribution system 67 is installed within the channel defined by rails 63, 64 with the longitudinal center line of the distribution system aligned with the longitudinal center lines of the top and bottom rails. As previously described, system 67 includes identical, but oppositely directed power blocks located near the opposite ends of a panel unit.

The power blocks and interconnecting wiring therefor are assembled as a unit 67, as shown in FIG. 2, and the unit 67 is installed in the panel during manufacture of the panel. The unit 67 is secured in the wiring channel of the panel by fasteners that attach the mounting brackets 68, 68' at each end of unit 67 to the vertical brackets 65, 65' of the panel unit. After installation of the desired combination of plug-in components at the panel installation site, the wiring system may be concealed by decorative finish covers. The end of one such cover is seen at 69 in FIG. 1.

FIG. 21 is an alternative embodiment 267 of the power distribution system of the present invention, which is designed for use in wall panels that are too narrow in width to accept the previously described system. This embodiment includes one power block unit 10' for interconnecting a panel-to-panel connector 25 and up to two duplex outlet units and block portion 210 for connecting a panel-to-panel connector 25. Portion 210 includes post section 201 for securing connector 25 thereto in the manner as previously described.

FIG. 22 is a further alternative embodiment of the power distribution system of the present invention, which is designed primarily for use in wall panels that are too narrow in width to accept either of the previously described systems. This embodiment includes two block portions 210, 210' for connecting two panel-to-panel connectors 25, 25'. Portions 210, 210' include post sections 201, 201' for securing respective connectors 25, 25' thereto in the manner as previously described. This embodiment provides "pass through" capabilities only.

Obviously, many modifications and variations in the specific embodiment of the invention described herein are possible in the light of the above teachings. It is therefore to be understood that the invention may be practiced otherwise than as specifically disclosed without departing from the spirit and scope of the appended claims.

The embodiments of the invention in which an exclusive property or privilege is claimed are defined as follows:

1. A multicircuit electrical system for office furniture units and the like of the type having a utility raceway associated therewith, comprising:
- a plurality of electrical conductors extending between opposite ends of the utility raceway, and including at least a first conductor associated with a first power circuit, at least a second conductor associated with a second power circuit, and a common conductor associated with both of said first and second power circuits;
- a power block adapted for mounting in the utility raceway, and including a first power block contact electrically connected with said first conductor, a second power block contact electrically connected with said second connector, and third and fourth power block contacts electrically connected with said common conductor; said third and fourth power block contacts being horizontally aligned on said power block along a line disposed below said first power block contact and above said second power block contact in a spaced arrangement which minimizes the overall height of said power block;
- a removable power outlet adapted for selectively tapping power from said electrical system, and including means for detachably connecting the same with said power block in first and second orientations disposed generally 180 degrees apart; said power outlet including at least first and second outlet contacts arranged such that in said first orientation of said power outlet on said power block, said first and second outlet contacts electrically connect with said first and third power block contacts respectively to tap power from said first circuit, and in said second orientation of said power outlet on said power block, said first and second outlet contacts electrically connect with said second and fourth power block contacts to tap power from said second circuit.

2. The powerway as defined in claim 1 wherein at least one of said third and fourth power block contacts projects outwardly from said power block for receipt in said removable power outlet.

3. The powerway as defined in claim 2 wherein at least one of said first and second outlet contacts projects outwardly for connection with one of said first and second power block contacts in said power block.

4. The powerway as defined in claim 1 wherein said common conductor is connected to electrical ground.

5. The powerway as defined in claim 1 wherein said plurality of electrical conductors further include a fourth conductor associated with a third power circuit, a fifth conductor associated with a fourth power circuit, a fifth power block contact electrically connected to said fourth conductor, a sixth power block contact electrically connected to said fifth conductor, said fifth contact spaced on said power block above said first power block contact and said sixth contact spaced on said power block below said second contact, a second removable power outlet adapted for selectively tapping power from said electrical system, and including means for selectively connecting the removable power outlet with said power block in first and second orientations disposed generally 180 degrees apart, said second removable power outlet including a third outlet contact and a fourth outlet contact, said fourth outlet contact identical to said second outlet contact, arranged such that in said first orientation of said second power outlet on said power block, said third and fourth outlet contacts electrically connect with said fifth and fourth power block contacts to tap power from said third power circuit and in said second orientation of said power outlet on said power block, said third and fourth outlet contacts electrically connect with said sixth and third power block contacts to tap power from said fourth power circuit.

6. The powerway as defined in claim 5 wherein said common conductor in said power block is connected to safety ground.

7. The powerway as defined in claim 1 wherein said removable outlet unit is at least a duplex power outlet.

8. The powerway as defined in claim 1 wherein said third and fourth power outlet contacts are disposed at about the vertical center of said power block and said second outlet contact is disposed at about the vertical center of said removable power outlet.

9. A modular powerway for furniture units, and the like, comprising:
- a power block including a power block housing and conductors within said power block;
- a removable power outlet including a power outlet housing, said power outlet housing including a base adapted to receive and mount therein a plurality of contacts for connecting with selected conductors within said power block;
- a first pair of said contacts adapted to be carried within said base for connecting with a first or a second pair of said conductors in said power block when said first pair of contacts are assembled in said base and said removable power outlet is assembled to said power block at different, respective, orientations; and
- a second pair of contacts adapted to be carried within said base for connecting with a third or a fourth pair of conductors in said power block when said second pair of contacts are assembled in said base and said removable power outlet is assembled to said power block at different, respective, orientations;
- whereby said removable power outlet is adapted to connect with each one of said four different pairs of conductors using said two pairs of contacts and by assembling said removable power outlet to said base in said different, respective, orientations.

10. The powerway as defined in claim 9 wherein one of said conductors in said power block is a common conductor, one of said conductors of each of said first and second pairs of conductors is disposed below said common conductor of said power block and one of said conductors of each of said second and fourth pairs of conductors is disposed above said common conductor.

11. The powerway as defined in claim 9 wherein one of said conductors of said first pair of conductors is connected to a first power circuit, whereby when said first pair of contacts are assembled in said base and said removable power outlet is assembled to said power block at a first orientation, said power outlet taps power from said first power circuit.

12. The powerway as defined in claim 9 wherein one of conductors of said second pair of conductors is connected to a second power circuit, whereby when said first pair of contacts is assembled in said base and said removable power outlet is assembled to said power block at a second angular orientation, said removable power outlet taps power from said second power circuit.

13. The powerway as defined in claim 9 wherein one of said conductors of said third pair of conductors is connected to a third power circuit, whereby when said second pair of contacts is assembled in said base and said removable power outlet is assembled to said power block at said first angular orientation, said removable power outlet taps power from said third power circuit.

14. The powerway as defined in claim 9 wherein one of said conductors of said fourth pair of conductors is connected to a fourth power circuit, whereby when said second pair of contacts is assembled in said base and said removable power outlet is assembled to said power block at said second angular orientation, said removable power outlet taps power from said fourth power circuit.

15. The powerway as defined in claim 9 wherein said power block includes a common conductor disposed at about the vertical center of said power outlet unit housing, and said power outlet unit includes a common contact mounted in said outlet unit housing base, said common contact disposed at about a vertical center of said power outlet unit base and adapted to connect with said common conductor.

16. The powerway as defined in claim 15 wherein said common conductor is connected to ground whereby said common contact provides a safety ground for said outlet unit.

17. The powerway as defined in claim 9 wherein said removable power outlet is at least a duplex outlet.

18. A modular powerway for furniture units, and the like, comprising:
   a power block housing having first and second faces arranged on opposite sides thereof for access from externally of the furniture unit;
   a plurality of conductors carried within the power block housing;
   a first array of openings positioned on the first face of the power block housing, and extending laterally therethrough to a location adjacent the second face of the power block housing, and shaped to provide access to the conductors within the power block housing;
   a second array of openings positioned on the second face of the power block housing, and extending laterally therethrough to a location adjacent the first face of the power block housing, and shaped to provide access to the conductors within the power block housing; and
   wherein the first and second arrays of openings on the first and second faces are arranged in a vertically staggered fashion on the power block housing, wherein the first array of openings in the first face of the power block housing are not aligned with the second array of openings in the second face of the power block housing to minimize the powerway width and provide a compact powerway construction.

19. The powerway as defined in claim 18, further including a third array of openings on the first face of the power block housing, and extending laterally therethrough to a location adjacent to the second face of the power block housing, and shaped to provide access to the conductors within the power block housing;
   a fourth array of openings on the second face of the power block, and extending laterally therethrough to a location adjacent to the first face of the power block housing, and shaped to provide access to the conductors within the power block housing; and
   wherein the third and fourth arrays of openings on the front and back faces are arranged such that the third array of openings on the first face of the power block are not aligned with the fourth array of openings on the second face of the power block housing.

20. The powerway as defined in claim 19, wherein the first and second arrays of openings on the first and second faces of the power block each include two generally vertical columns of openings.

21. The powerway as defined in claim 20, wherein the two generally vertical columns of the first array are laterally aligned with the two generally vertical columns of the second array.

22. The powerway as defined in claim 18, further including a plug-in unit including a plurality of contacts for connection with at least one of the conductors of the power block through the openings on the first face or the second face, each of the contacts adapted to extend substantially across the width of the at least one conductor when the plug-in unit is assembled to the power block whereby the contacts make a durable, wiping, connection with the at least one conductor.

23. The powerway as defined in claim 22 wherein the plug-in unit contacts are housed within silos, a length of the silos substantially the same as a length of the openings, whereby the silos extend substantially the entire length of the openings when the plug-in unit is assembled to the power block, and the silos provide rigid support for the plug-in unit.

* * * * *

UNITED STATES PATENT AND TRADEMARK OFFICE
CERTIFICATE OF CORRECTION

PATENT NO. : 5,203,713
DATED : April 20, 1993
INVENTOR(S) : Jay L. French et al.

It is certified that error appears in the above-identified patent and that said Letters Patent is hereby corrected as shown below:

In claim 12, column 22, line 62, after 'of', first occurrence, insert --said--.

Signed and Sealed this

Third Day of May, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,203,713
DATED : April 20, 1993
INVENTORS : Jay L. French et al.

It is certified that error appears in the above-identified patent and that said Letters Patent is hereby corrected as shown below:

Column 2, line 38;
After "prongs spaced", insert --along the length of the plate projecting outwardly from opposite sides of the plate. Each of the projecting prongs is surrounded by an insulating shroud to protect against accidental contact. The vertical spacing between the plates is necessarily increased to provide space for the horizontal walls separating the vertically aligned insulating shrouds, so that the height of the power block extends substantially the entire available height of the wiring channel in the lower edge of the panel. Also, the outwardly projecting prongs and insulating shrouds increase the thickness of the power blocks, necessitating a reduction in the thickness of the duplex outlets used with the power blocks, if the faces of the duplex outlet units are to be maintained flush with the bottom edge of the panel unit.
 An additional difficulty encountered when increasing the number of power supply circuits in a power block and providing a power outlet therefor, is accommodating an outlet which is selectively connectable with different supply circuits in the power block within a raceway originally designed for a three-wire distribution system. Heretofore, power outlets for connection to different ones of the supply circuits in a power block typically include a moveable connector which is adjusted to interconnect with different conductors in the power block when the outlet is assembled thereto. An alternative to power outlets having adjustable connectors uses a simplex outlet with fixed connectors which is assembled to the power block at different angular orientations to connect to different circuits in the power block. Regardless of which type of selective connector is used, these outlets are utilized with power blocks having no more than seven--.

Column 3, line 5;
After "block." delete "along the length . . ."" through line 37 ""more than seven"". (Note, page 4 inserted in wrong place.)

Column 3, line 48;
After "thereof" insert --.--.

UNITED STATES PATENT AND TRADEMARK OFFICE
CERTIFICATE OF CORRECTION

PATENT NO. : 5,203,713
DATED : November 12, 1991
INVENTORS : Jay L. French et al.

It is certified that error appears in the above-identified patent and that said Letters Patent is hereby corrected as shown below:

Column 9, line 27;
After "94 is" delete "in Fig. 5. . . . 59"".

Column 9, line 64;
After "component" insert –.–.

Column 11, line 58;
"125. Which" should be –125 which–.

Column 13, line 50;
"in an" should be –in any–.

Column 14, line 14, (last line of table);
"Line 3 L3)" should be –Line 3 (L3)–.

Column 15, line 5;
"bas" should be –base–.

Column 16, line 33;
After "receptacles" insert –.–.

Column 18, line 37;
After "therein" insert –.–.

Signed and Sealed this

First Day of November, 1994

*Attest:*

*Attesting Officer*

BRUCE LEHMAN

*Commissioner of Patents and Trademarks*